United States Patent [19]
Miyazaki

[11] Patent Number: 5,744,929
[45] Date of Patent: Apr. 28, 1998

[54] STEPPING MOTOR DRIVE CONTROL DEVICE FOR AN ELECTRONIC APPARATUS

[75] Inventor: Hideto Miyazaki, Yokohama, Japan

[73] Assignee: Ricoh Company, Ltd., Tokyo, Japan

[21] Appl. No.: 582,421

[22] Filed: Jan. 3, 1996

[30]     Foreign Application Priority Data

Jan. 11, 1995  [JP]  Japan ................................. 7-002466
Jan. 26, 1995  [JP]  Japan ................................. 7-010894
Dec. 13, 1995  [JP]  Japan ................................. 7-324731

[51] Int. Cl.$^6$ ........................... H02P 8/00; H04N 1/04; B41J 29/38
[52] U.S. Cl. ................... 318/696; 318/685; 358/260; 358/294; 355/204
[58] Field of Search .................. 318/139, 138, 318/245, 254, 560–696; 355/235, 50, 202, 77, 208, 51, 204; 358/474, 538, 412, 537, 406, 442, 401, 409, 473, 410; 400/903, 322; 346/139 R, 1.1, 140 R

[56]     References Cited

U.S. PATENT DOCUMENTS

| 4,586,808 | 5/1986 | Tanimoto et al. | 355/8 |
| 5,146,601 | 9/1992 | Hosaka et al. | 395/800 |
| 5,189,436 | 2/1993 | Yoshikawa | 346/1.1 |
| 5,245,359 | 9/1993 | Ito et al. | 346/139 R |
| 5,260,811 | 11/1993 | Morikawa | 358/474 |

*Primary Examiner*—Paul Ip
*Attorney, Agent, or Firm*—Oblon, Spivak, McClelland, Maier & Neustadt, P.C.

[57]     ABSTRACT

In a copier or similar electronic apparatus including a stepping motor, a device for controlling the drive of the motor loads control data for acceleration, constant-speed drive and deceleration stored in a ROM (Read Only Memory) or a RAM (Random Access Memory). The device controls the motor via a motor driver with the control data. This successfully reduces the load on a CPU (Central Processing Unit) due to the acceleration, constant-speed drive and deceleration of the motor, thereby implementing high-speed and accurate drive of the motor.

9 Claims, 21 Drawing Sheets

Fig. 12A
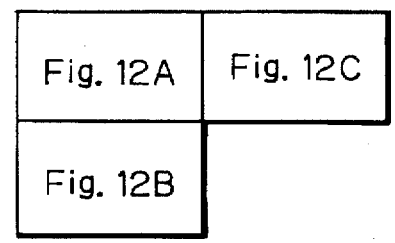
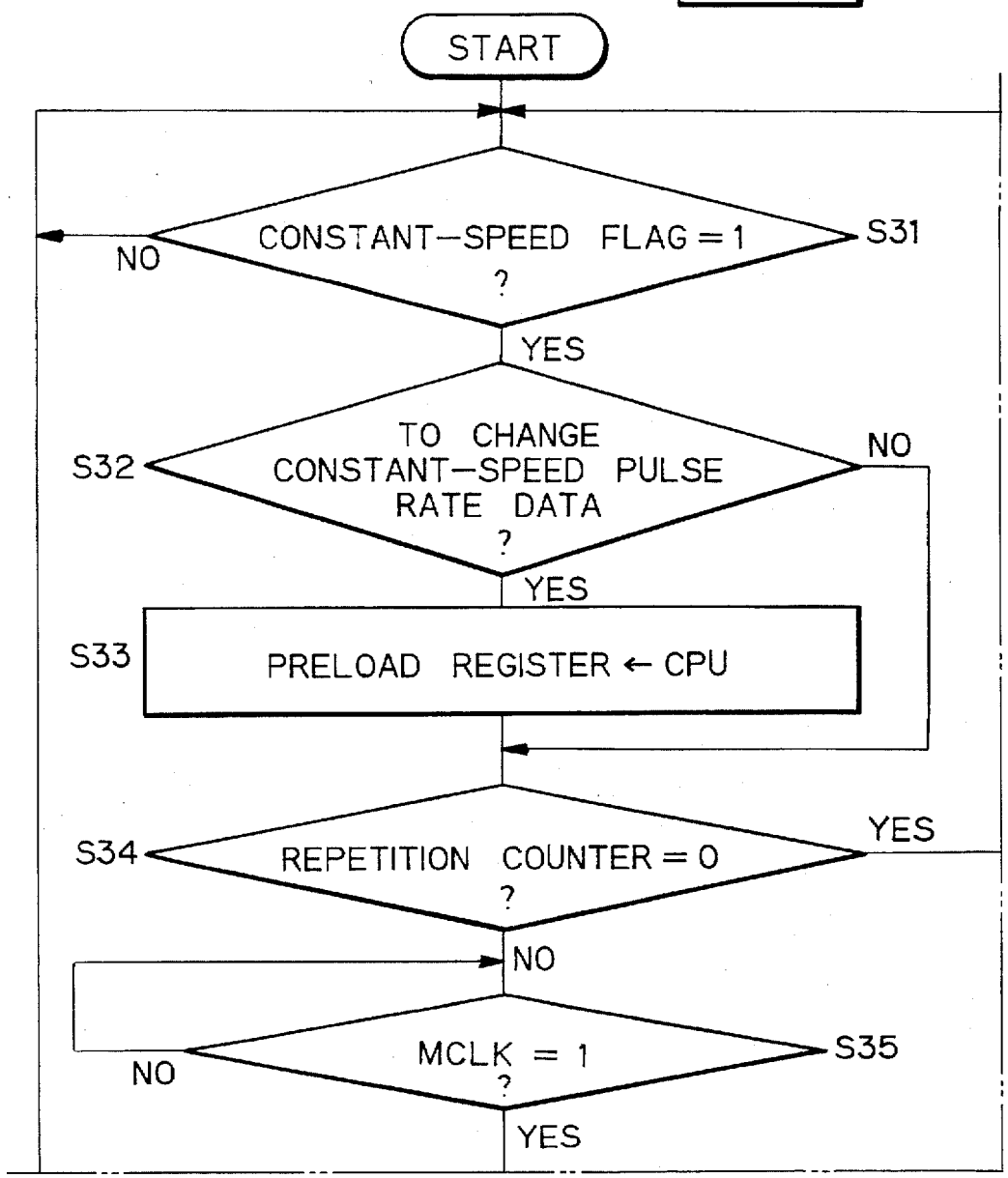

STEPPING MOTOR DRIVE CONTROL DEVICE FOR AN ELECTRONIC APPARATUS

BACKGROUND OF THE INVENTION

The present invention relates to a device for controlling the drive of a stepping motor included in an electronic apparatus as a drive source and, more particularly, to a stepping motor drive control device for a copier or similar image forming apparatus.

In a digital copier, for example, when a copy start key is pressed after a document has been set on a glass platen, a scanner section including a carriage (movable section) is driven by a drive source in the horizontal direction. The carriage carrying mirrors and a light source therewith sequentially scans the image surface of the document. The resulting imagewise reflection from the document is incident to the light-sensitive surface of a CCD (Charge Coupled Device) color image sensor via mirrors and a lens. The image sensor transforms the incident light to corresponding image data. The image data are written to an image memory and then read thereoutof in order to form the image of the document on a paper.

Usually, the drive source of the scanner section is implemented by a stepping motor. To rotate the stepping motor, phase drive signals synchronous to drive pulses are applied to motor drive means, as well known in the art. Slue-up control and slue-down control are essential for the stepping motor to rotate at frequencies higher than the self-start frequency. However, when all of these kinds of control are assigned to a microprocessor which collectively controls the entire apparatus, the load on the microprocessor is heavy. Particularly, when the microprocessor executes the control over the motor and any other control in parallel, the frequency of drive pulses meant for the motor cannot be increased beyond a certain limit. As a result, the above copier cannot have its processing speed increased.

In light of the above, Japanese Patent Laid-Open Publication No. 63-212580, for example, proposes a motor control device applicable to a printer and assigning the slue-up and slue-down control of a stepping motor to a microprocessor while assigning constant-speed control to motor drive means. Although this kind of scheme reduces the load on the microprocessor during the constant-speed drive of the motor, it cannot do so during slue-up and slue-down control (particularly in the vicinity of a constant-speed range). Hence, the rotation speed of the motor cannot be sufficiently increased.

On the other hand, the carriage of the scanner section arrives at a document reading position after running about 10 mm to 30 mm. This part of the movement guarantees a period of time for confining the vibration at the time of a start in an allowable range, and a period of time for accelerating the carriage to a reading speed. At the time when the carriage reaches the reading position, various kinds of control for image formation including control over paper feed from a tray and the charging of a photoconductive element begin. Therefore, the arrival of the carriage at the reading position (set number of steps of the motor) needs to have a real-time characteristic. The time of arrival of the carriage at the reading position has customarily been managed by software processing using the microprocessor, increasing the load on the microprocessor. This requires a high performance microprocessor which increases the cost of the entire apparatus.

SUMMARY OF THE INVENTION

It is therefore an object of the present invention to provide a drive control device capable of driving a stepping motor accurately at high speed while freeing a microprocessor from an extra load.

It is another object of the present invention to provide a drive control device capable of managing the time when a stepping motor reaches a persecuted number of steps while freeing a microprocessor from an extra load, and thereby reducing the cost of an apparatus in which the device is included.

In accordance with the present invention, a device for controlling the drive of a stepping motor which is drive means for driving the movable section of an electronic apparatus has a motor driver for driving the stepping motor, a microprocessor for controlling the motor driver, a memory for storing control data to be used during the acceleration, constant-speed drive and deceleration of the stepping motor, and a motor controller for loading the control data stored in the memory without the intermediary of the microprocessor, and controlling the stepping motor via the motor driver with the control data.

Also, in accordance with the present invention, an electronic apparatus including a movable section has a stepping motor for driving the movable section and a control device for controlling the drive of the stepping motor. The control device has a motor driver for driving the stepping motor, a microprocessor for controlling the motor driver, a memory for storing control data to be used during the acceleration, constant-speed drive and deceleration of the stepping motor, and a motor controller for loading the control data stored in the store means without the intermediary of the microprocessor, and controlling the stepping motor via the motor driver with the control data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
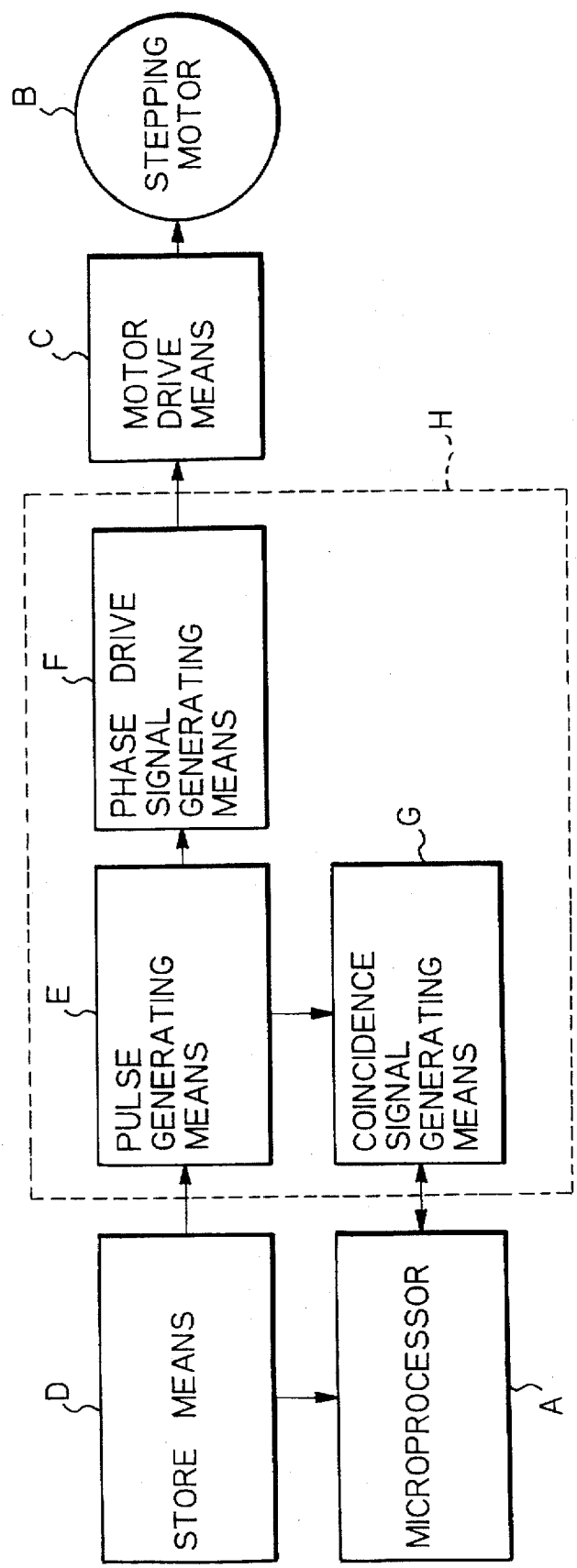
FIG. 1 is a block diagram schematically showing the basic construction of a stepping motor drive control device embodying the present invention.

Referring to FIG. 1 of the drawings, the basic arrangement of a stepping motor drive control device embodying the present invention is shown. As shown, the device has motor drive means C, motor control means H for controlling the motor driving means C, store means D, and a microprocessor A. The motor control means H is made up of pulse generating means E, phase drive signal generating means F, and coincidence signal generating means G. The individual blocks shown in FIG. 1 will be described in detail later.

Figure 2:
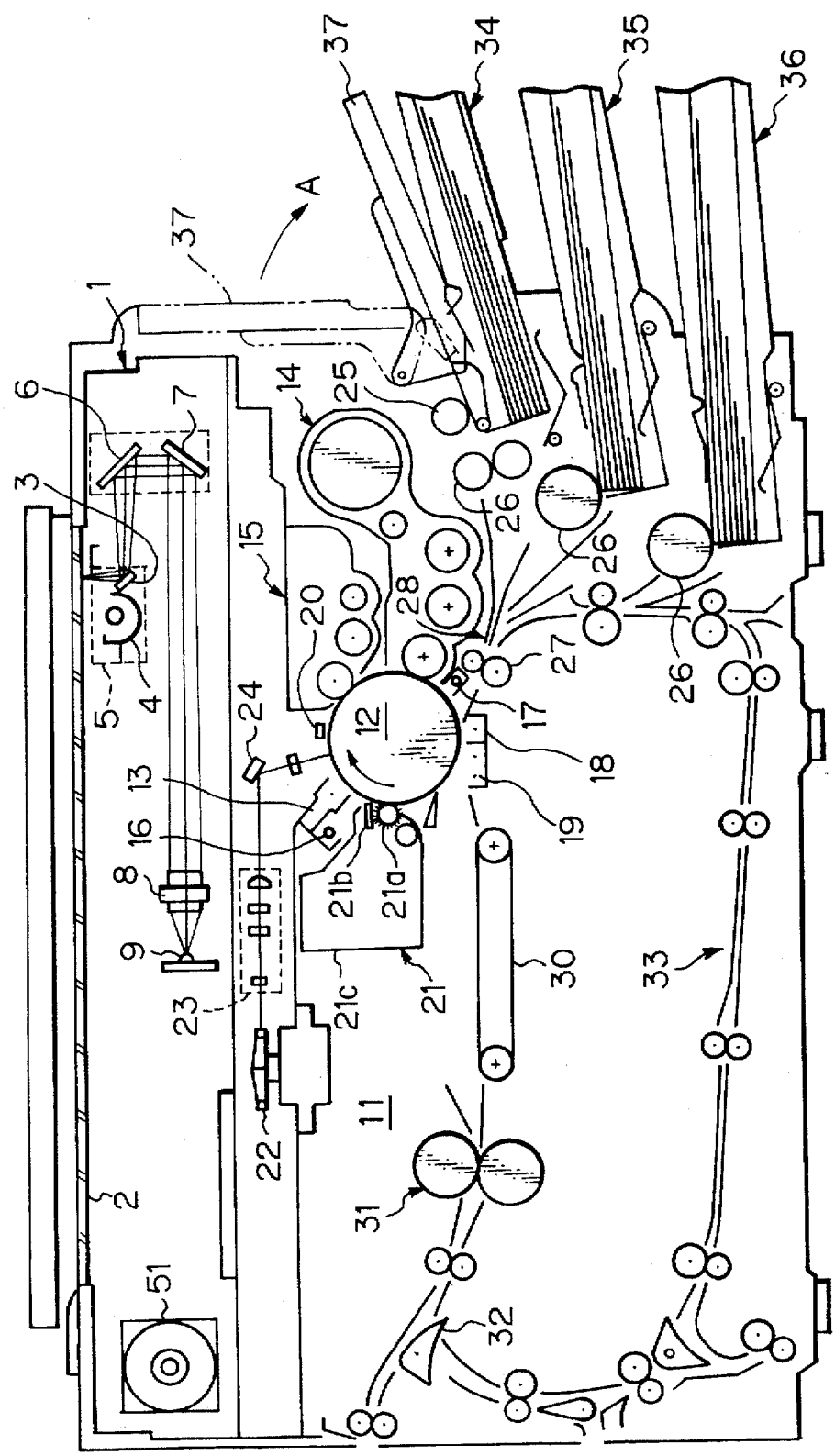
FIG. 2 is a section showing the general construction of a digital copier to which the present invention is applicable.

FIG. 2 shows a digital copier belonging to a family of electronic apparatuses to which the present invention is applicable. As shown, the copier has a scanner section (movable section) 1 and an image forming section 11. The operator of the copier sets desired copying conditions on an operation panel, not shown, lays a document on a glass platen 2, and then presses a copy start key. In response, the scanner section 1 starts reading the document. Specifically, a carriage 5 including a first mirror 3 and a light source (fluorescent lamp) 4 is moved to the left, as viewed in FIG. 2, by a stepping motor 51. The light source 4 sequentially scans or illuminates the underside of the document (image surface). The resulting imagewise reflection from the document is routed through the first mirror 3, a second mirror 6 and a third mirror 7 to a lens 8. The lens 8 focuses the imagewise light onto a CCD color image sensor 9. The image sensor 9 transforms the incident light to corresponding image data. The image data are written to an image memory which will be described.

In practice, the carriage 5 starts reading the document after it has been started to move by the stepping motor 51 and has moved about 10 mm to 30 mm to a preselected reading position, i.e., after the motor 51 has reached a preselected number of steps. The reading position of the carriage 5, i.e., the preselected number of steps of the motor 51 will be described specifically later.

While the image sensor 9 is shown in the form of a single CCD, in practice it is made up of three CCD image sensors respectively assigned to red (R), green (G), and blue (B). A beam splitter evenly splits the light beam incident thereto from the lens 8 into three. The three beam components are respectively incident to the R, G and B image sensors via R, G and B color filters. Alternatively, use may be made of a single CCD image sensor and three color filters. In this case, the scanning movement is repeated three times with the filters sequentially replaced in order to read R, G and B data. These technologies are conventional with a color copier or similar image forming apparatus.

The image forming section 11 outputs the image data stored in the image memory as an image. Specifically, a photoconductive drum 12 is rotated in the direction indicated by an arrow in FIG. 1. A discharge lamp or quenching lamp 16, a pretransfer discharge lamp 17, a transfer charger 18, an eraser 20 and a cleaning unit 21 are driven such that the surface potential of the drum 12 moved away from the discharge lamp 16 drops substantially to zero. This prevents toner particles and irregular potentials remaining on the drum 12 from reaching a main charger 13 and developing units 14 and 15. Subsequently, the main charger 13 uniformly charges the surfaces of the drum 12. In this condition, the image data stored in the image memory are read out. A semiconductor laser emits a laser beam representative of the image data. The laser beam is condensed by a cylinder lens, not shown, and then incident to a polygonal mirror 22 which is in rotation. The beam reflected by the mirror 22 scans the charged surface of the drum 12 via optics (lens) 23 and a mirror 24, thereby electrostatically forming a latent image on the drum 12.

The eraser 20 dissipates the charge from the non-image area (needless portion outboard of an image forming area) of the drum 12. The developing units 14 and 15 store a black toner and a color toner, respectively. The developing unit 14 or 15 deposits the respective toner on the latent image of the drum 12 so as to develop it. At this instant, a bias potential applied to the developing unit 14 or 15 is variable in order to adjust the tonality of the image.

A paper feed clutch, not shown, selectively transmits the output torque of a main motor, not shown. When the clutch is coupled, one of a pick-up roller 25 and three feed rollers 26 is driven to feed a paper from preselected one of paper feed stages, which will be described, toward a registration roller pair 27 which is in a halt. A registration sensor 28 is positioned upstream of the roller pair 27 with respect to the direction of paper feed and implemented by, but not limited to, a reflection type photosensor. The sensor 28 turns on when it senses the leading edge of the paper. On the elapse of a predetermined period of time after the sensor 28 has sensed the paper, the paper feed clutch is uncoupled to interrupt the transport of the paper.

The timing for uncoupling the above clutch is selected to be longer than the period of time over which the paper is conveyed between the sensor 28 and the roller pair 27. Hence, after the leading edge of the paper has abutted against the roller pair 27 which is in a halt, the paper waits for further drive with its leading edge portion warping. This prevents the paper from, e.g., running askew. Subsequently, a registration clutch is coupled at a timing matching the leading edge of the image carried on the drum 12. As a result, the roller pair 27 is rotated to convey the paper toward an image transfer station where the transfer charger 18 is positioned. When the paper reaches the image transfer station, the transfer charger 18 transfers the toner image from the drum 12 to the paper. A separation charger 19 is held integrally with the transfer charger 18. The charger 19 lowers the charge potential of the paper and thereby reduces the adhesion acting between the paper and the drum 12. Then, a separator 29 separates the paper from the drum 12.

A conveyor belt 30 is passed over two rollers and conveys the paper to a fixing section. The toner image is fixed by a heat roller 31 included in the fixing section. In a simplex copy mode, the paper is driven out to a tray, not shown, via a path above a path selector 32. In a duplex copy mode, the path selector 32 is switched to steer the paper into a refeed path 33 defined in a lower portion of the copier.

A cleaning brush 21a and a cleaning blade 21b constitute a cleaning unit 21 and remove the toner remaining on the drum 12 after the image transfer. The removed toner is collected in a tank 21c. The discharge lamp 16 dissipates the charge also remaining on the drum 12 by illuminating the entire surface of the drum 12.

The copier has three removable cassettes 34-36 each being loaded with a stack of papers of particular size, and a manual feed table or tray 37 available for papers of irregular sizes. When the operator desires to use the papers stored in one of the cassettes 34-36, the operator selects the cassette size on the operation panel and then presses the copy start key. On the other hand, to use papers of any irregular size, the operator opens the table 37 from a closed position indicated by a phantom line to an open position indicated by a solid line in a direction A, sets papers of desired size on the table 3, and then presses the copy start key.

Figure 3:
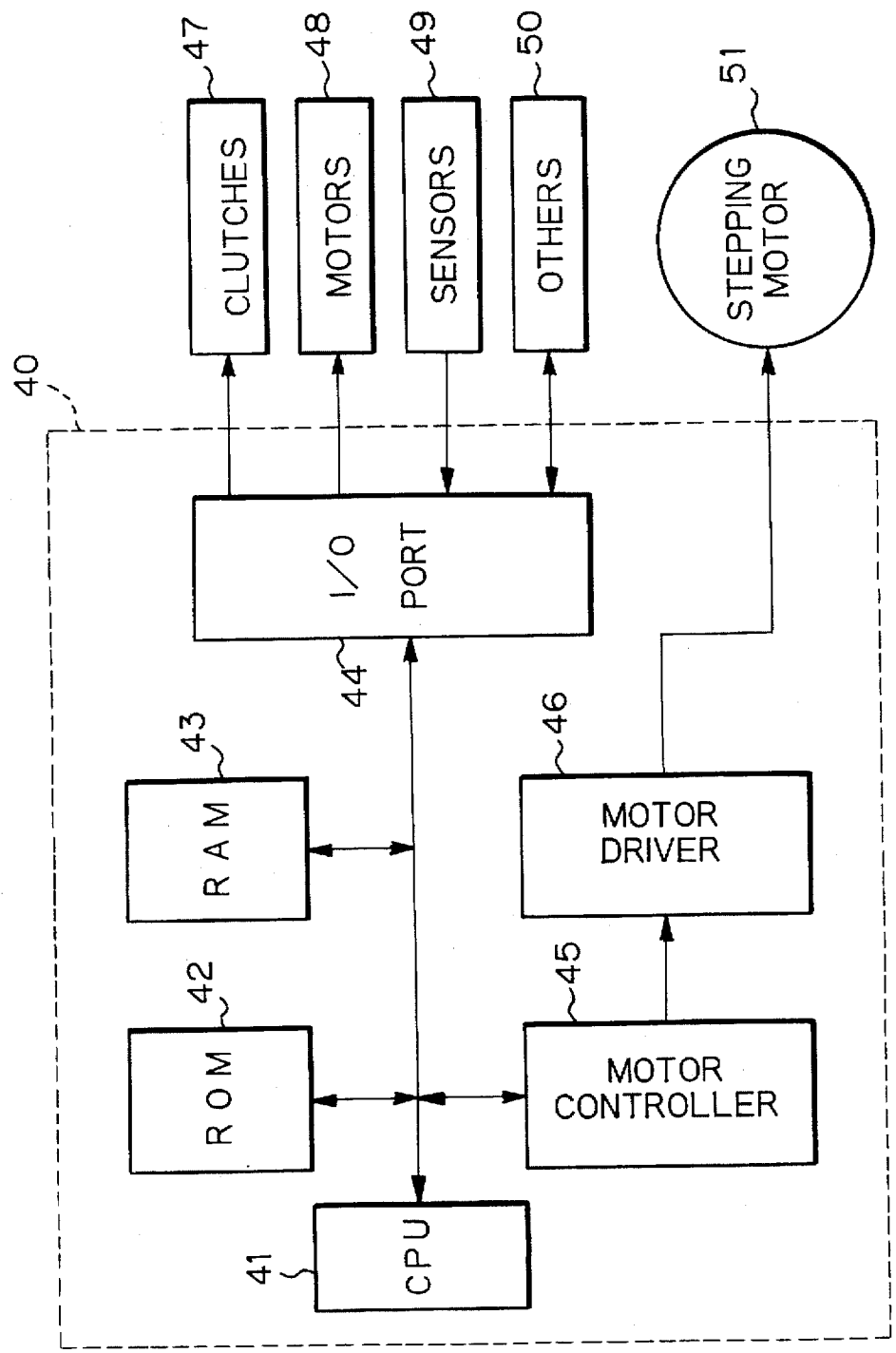
FIG. 3 is a block diagram schematically showing a specific construction of a control section included in the copier shown in FIG. 2.

FIG. 3 shows a specific construction of a control section included in the copier. As shown, the control section, generally 40, has a CPU (Central Processing Unit) 41, a ROM (Read Only Memory) 42, a RAM (Random Access Memory) 43, I/O (Input/Output) port 44, a motor controller 45, and a motor driver 46. The CPU 41 is a general-purpose microprocessor and collectively controls the entire control section 40. The ROM 42 stores a control program for causing the CPU 41 to operate, and various kinds of fixed data including control data for the acceleration, constant-speed drive and deceleration of the motor 51 (step-by-step pulse rate data). The RAM 43 serves as a work memory to be used by the CPU 41, and an image memory for storing the image data generated by the scanner section 1, FIG. 2. The I/O port 44 controls the input and output of various kind of signals interchanged between the control section 40 and clutches 47, motors 48 except for the stepping motor 51, sensors 49, and others 50. The motor controller 45 corresponding to the motor control means H, FIG. 1, sends phase drive signals synchronous to drive pulses to the motor driver 46, thereby rotating the motor 51. The control over the motor 51 will be described in detail later.

Figure 4:
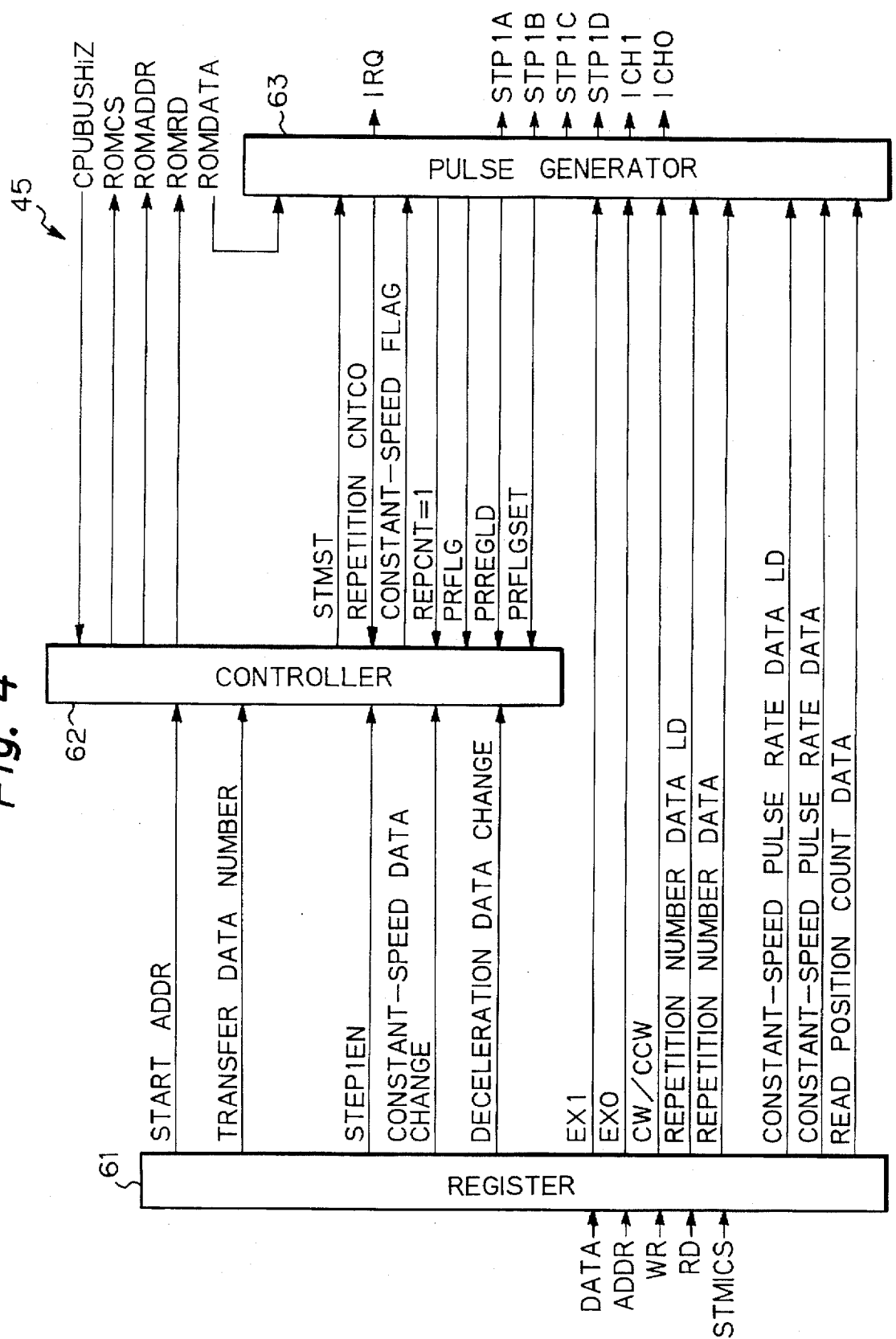
FIG. 4 is a block diagram schematically showing a specific construction of a motor controller shown in FIG. 3.

As shown in FIG. 4 specifically, the motor controller 45 has a register 61, a controller 62, and a pulse generator 63 which are interconnected by various signal lines or data lines. The register 61 temporarily stores data (signal) transferred (loaded) from the CPU 41. The controller 62 executes control for transferring the pulse rate data stored in the ROM 42 to the pulse generator 63 without the intermediary of the CPU 41. The pulse generator 63 generates drive pulses in response to the pulse rate data read out of the ROM 42, and outputs, e.g., phase drive signals for driving phase coils included in the motor 51 in synchronism with the drive pulses.

There are also shown in FIG. 4 data DATA, and an address ADD for writing and reading data in the register 61. A write signal WR is used to write data in the register 61 while a read signal RD is used to read data out of the register 61. A select signal STM1CS is a signal for selecting the motor controller 45. The data DATA, address ADDR and signals WR, RD and STM1CS are input to the register 61 by the CPU 41. A start address signal Start ADDR designates the start address of the pulse rate data stored in the ROM 42. Number of Transfer Data is data representative of the number of pulse rate data to be transferred (loaded). A motor start signal STP1EN starts up the stepping motor 51. Constant Speed Data Change is a signal for reporting a change of pulse rate data used during the constant speed drive of the motor 51. Deceleration Data Change is a signal for reporting a change of pulse rate data used during the deceleration of the motor 51. Bit signals EX1 and EX0 are used to select a method of driving the motor 51.

A bit signal CW/CCW is used to select the clockwise or counterclockwise rotation of the motor 51. Repetition Number Data is data indicative of how many times the pulse rate data for constant speed drive (constant speed pulse rate data) is repeated. Repetition Number Data LD is a repetition number data load signal for transferring the above repetition number data to a repetition counter which will be described. Constant Speed Pulse Rate Data is pulse rate data assigned to the constant speed drive of the motor 51 (but set by the CPU 41). Constant Speed Pulse Rate Data LD is a signal for transferring the above pulse rate data to a preload register which will be described. Read Position Count Data is data representative of a count corresponding to a period of time necessary for the carriage 5 to reach the reading position (preselected number of steps of the motor 51). A count enable signal STMST enables the count of a motor counter which will be described. Repetition CNTCO is a carry signal showing that the count of a repetition number counter which will be described has reached "0". A count signal REPCNT=1 shows that the count of the repetition number counter has reached "1". A preload flag PRFLG is used to request the transfer of the pulse rate data stored in the ROM 42 (data transfer request signal). A signal PRREGLD is used to transfer the pulse rate data signal stored in the ROM 42 to the preload register. A signal PRFLGSET is used to set the preload flag to "1".

A signal CPUBUSHiZ shows that a data bus, an address bus and a control bus (right signal line and read signal line) included in the CPU 41 are in a high impedance state (out of use). A signal ROMCS is used to select the ROM 42 in order to obtain the pulse rate data therefrom. A signal ROMADDR designates the address of the ROM 42 where pulse rate data to be obtained is stored. A signal ROMRD is used to obtain (read) the pulse rate data from the above address of the ROM 42. The pulse rate data to be transferred from the ROM 42 is labeled ROMDATA. A signal IRQ (coincidence signal) is generated when the count of drive pulses (synchronizing pulses) to be described later coincides with a count represented by the read position count data. Phase drive signals STP1A, STP1B and STP1C and STP1D drive the phase coils of the motor 51. Motor control signals ICH1 and ICH0 are added in the event of the quarter-step drive of the motor 51 which will be described later.

Figure 5:
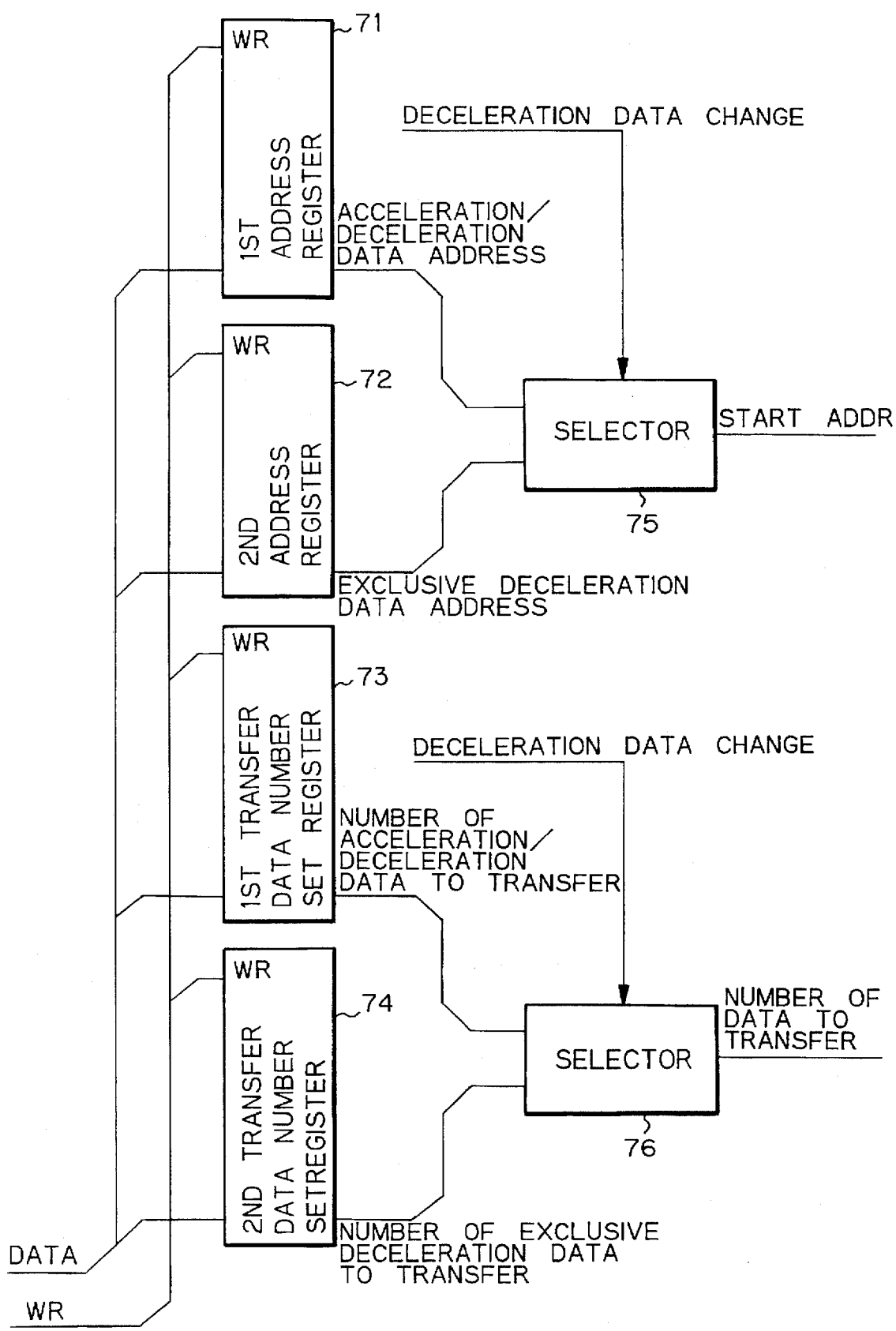
FIG. 5 is a block diagram schematically showing a specific construction of a data transfer control section included in a register shown in FIG. 4.

FIG. 5 shows a specific arrangement of a data transfer control section included in the register 61. As shown, the control section is made up of a first address register 71, a second address register 72, a first transfer data number register 73, a second transfer data number register 74, and selectors 75 and 76.

The first address register 71 stores, sets and outputs, in response to the write signal from the CPU 41, a data address signal transferred from the CPU 41 and common to acceleration and deceleration. The data address signal designates the start address where, among the pulse rate data stored in the ROM 42, the same pulse rate data for the acceleration and deceleration of the motor are stored. The second address register 72 stores, sets and outputs, in response to the write signal from the CPU 41, a data address signal transferred from the CPU 41 and exclusively assigned to deceleration. The exclusive data address signal designates the start address where, among the pulse rate data stored in the ROM 42, the data exclusively used for the deceleration of the motor 51 are stored.

The first transfer number set register 73 stores, sets and outputs, in response to the write signal from the CPU 41, the number of data to be transferred and common to acceleration and deceleration. Specifically, this data is representative of the number of, among the pulse rate data stored in the ROM 42, the same pulse rate data for acceleration and deceleration. The second transfer data number set register 74 stores, sets and outputs, in response to the write signal from the CPU 41, the number of data to be transferred and exclusively assigned to deceleration, i.e., the data stored in the ROM 42 and used only for deceleration.

The selector 75 usually selects the common acceleration/deceleration data address signal fed from the address register 71 and outputs it as the start address signal Start ADDR. On receiving the deceleration data change signal from the CPU 41, the selector 75 selects the exclusive deceleration data address signal input from the address register 72 and outputs it as the start address signal. The selector 76 usually selects the number of data to be transferred and common to acceleration and deceleration fed from the transfer data number set register 73. On receiving the deceleration data change signal from the CPU 41, the selector 76 selects the number of data to be transferred and exclusively assigned to deceleration input from the register 74.

Figure 6:
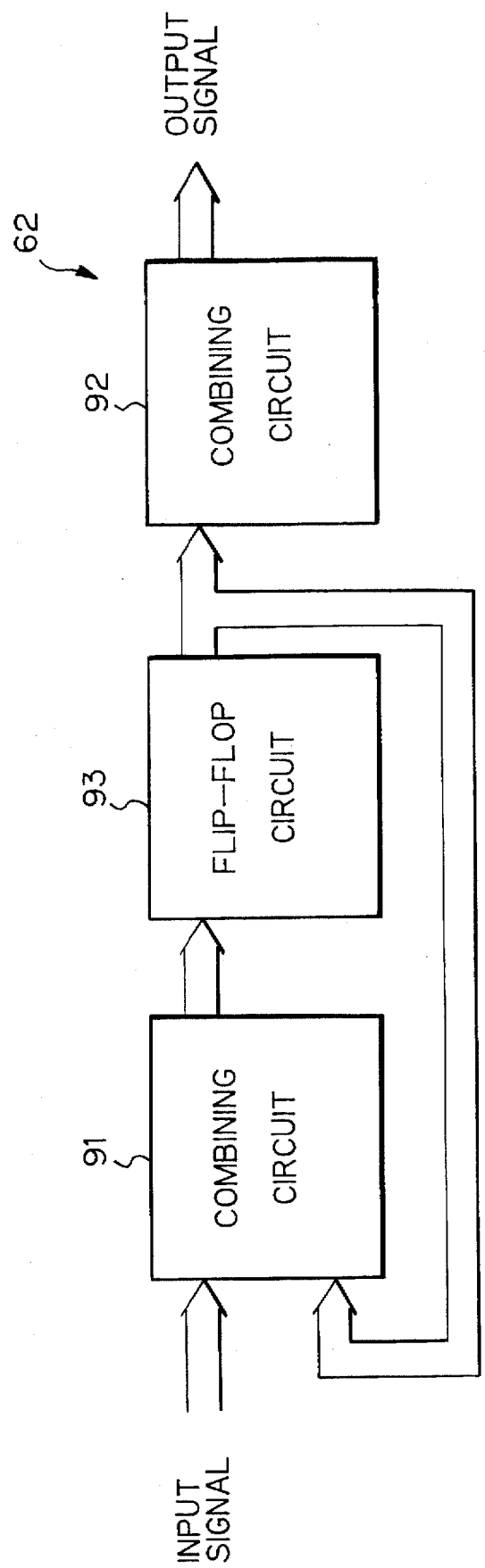
FIG. 6 is a block diagram schematically showing a specific construction of a controller also shown in FIG. 4.

FIG. 6 shows a specific construction of the controller 62 shown in FIG. 4. As shown, the controller 62 has a combining circuits 91 and 92 each consisting of various kinds of logic circuits, and a flip-flop circuit 93. The circuits 91, 92 and 93 respectively constitute a hardware sequencer for executing slue-up processing, a hardware sequencer for executing constant-speed processing, and a hardware sequencer for executing slue-down processing.

Figure 7:
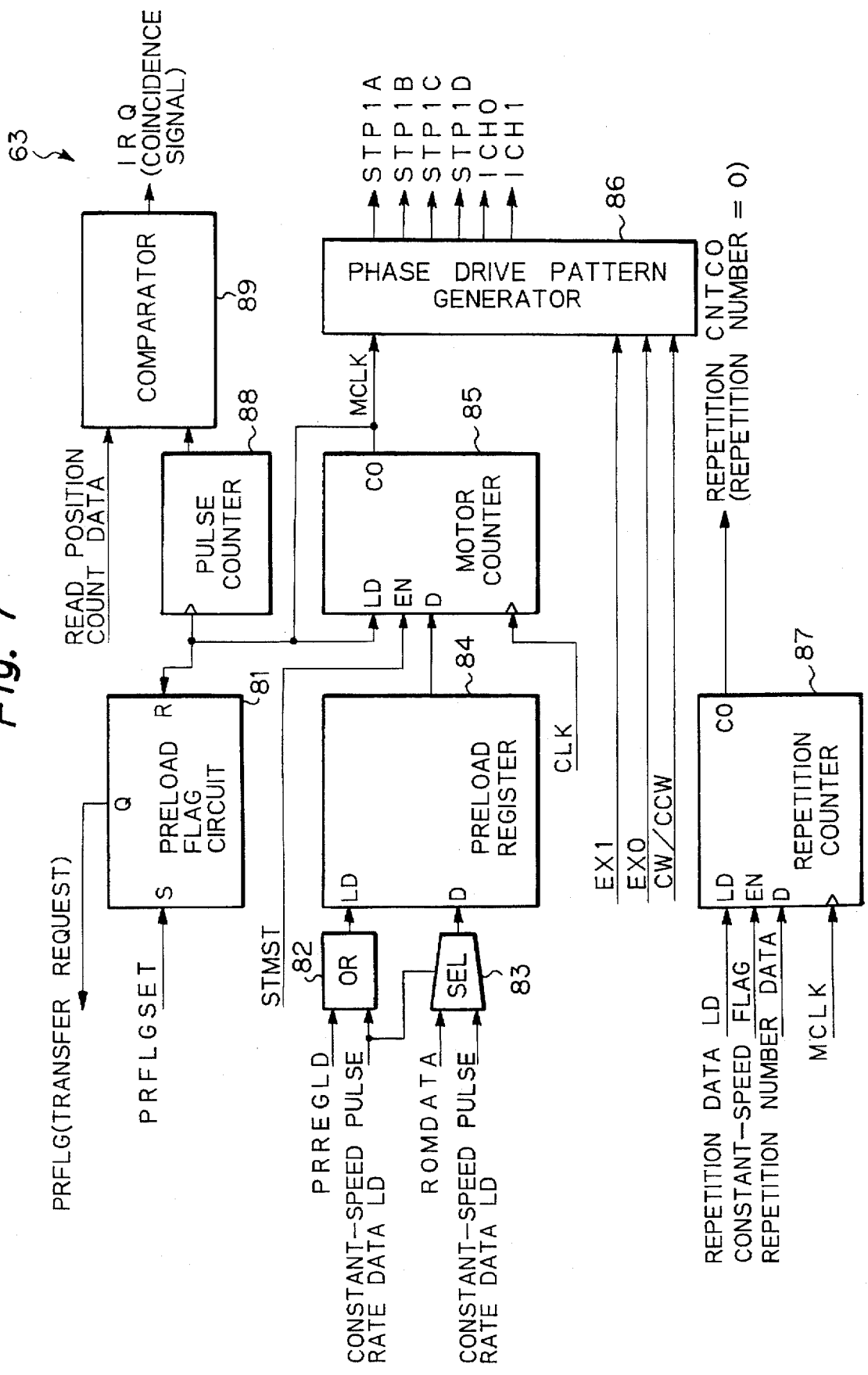
FIG. 7 is a block diagram schematically showing a specific construction of a pulse generator also shown in FIG. 4.

FIG. 7 shows a specific construction of the pulse generator 64 shown in FIG. 4. As shown, the pulse generator 64 has a preload flag circuit 81, an OR gate 82, a selector 83, a preload register 84, a motor counter 85, a phase drive pattern generator 86, a repetition counter 88, and a comparator 89.

When the controller 62 sends the preload flag set signal (PRFLGSET) to the preload flag circuit 81, the circuit 81 is set and does not request the transfer (loading) of the pulse rate data (ROMDATA) (PRFLG="1"). On receiving the synchronizing pulse (MCLK) from the motor counter 85, the circuit 81 is reset and requests the transfer of the pulse rate data (PRFLG=0). When the OR gate 82 receives the pulse data load signal (PRREGLD) from the controller 62, it directly outputs it. On receiving the constant-speed pulse rate data load signal or data LD from the register 61, the OR gate 82 directly outputs it. The selector 83 usually selects and outputs the pulse rate data (ROMDATA) loaded from the ROM 42. Only when the selector 83 receives the constant-speed pulse data load signal from the register 61, the selector 83 selects the constant-speed pulse rate data (set by the CPU 41) output from the register 61 and outputs it. When the preload register 84 receives the output signal of the OR gate 82, it takes in the pulse rate data from the selector 83 and outputs it.

When the motor counter 85 receives a load signal, not shown, from the controller 62, it sets the pulse rate data (number of pulse rates) output from the preload register 84. On receiving the count enable signal from the controller 62 (STMST="1"), the counter 85 is enabled and starts decrementing (or incrementing) in synchronism with a reference clock (CLK) output from a reference oscillator, not shown. When the count reaches "0" (or the number of pulse rates), the counter 85 once stops decrementing (or incrementing) and generates a synchronizing pulse (MCLK) which is a drive pulse. Then, the counter 85 again sets the pulse rate data output from the preload register 84, starts decrementing, and then repeats the above procedure. When the count enable signal from the controller 62 disappears (STMST="0"), the counter 85 is inhibited from decrementing. The phase drive pattern generator 86 selects a particular driving method and a particular driving direction for the motor 51 as instructed by the signals EX1, EX0 and CW/CCW output from the register 61. Then, the pattern generator 86 outputs the phase drive signals STP1A, STP1B, STP1C and STP1D in synchronism with the synchronizing pulses fed from the counter 85. Additionally, when the motor 51 is driven in a quarter-step mode, the pattern generator 86 outputs the motor control signals ICH1 and ICH0.

Figure 15:
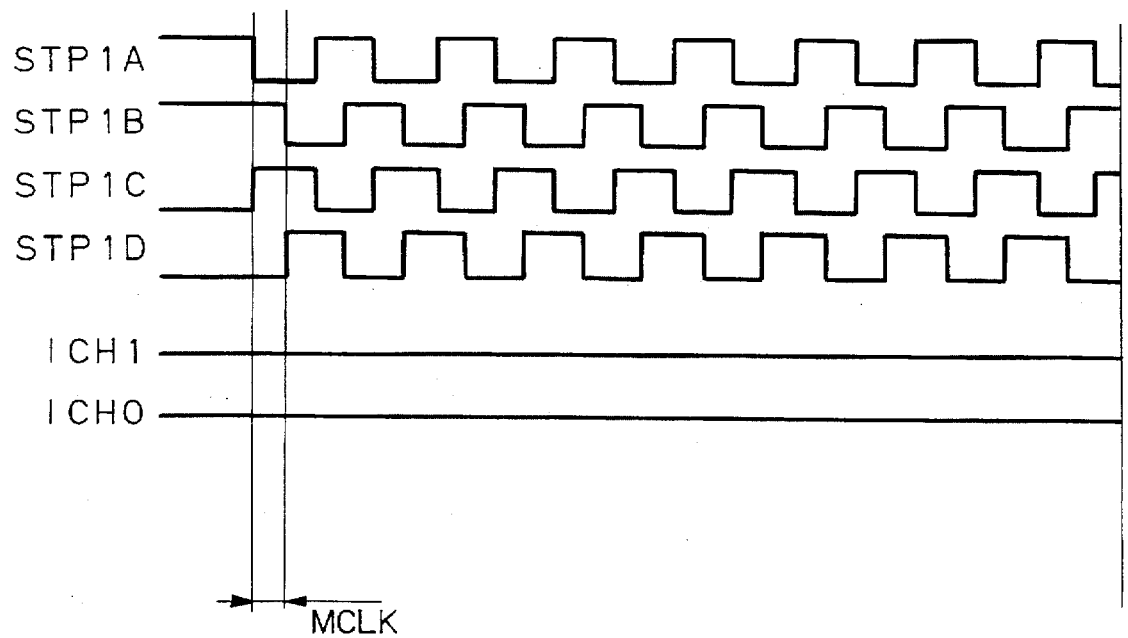
FIG. 15 is a timing chart showing phase drive signals and motor control signals to appear when a stepping motor shown in FIG. 3 are rotated forward in a full-step mode.
Figure 16:
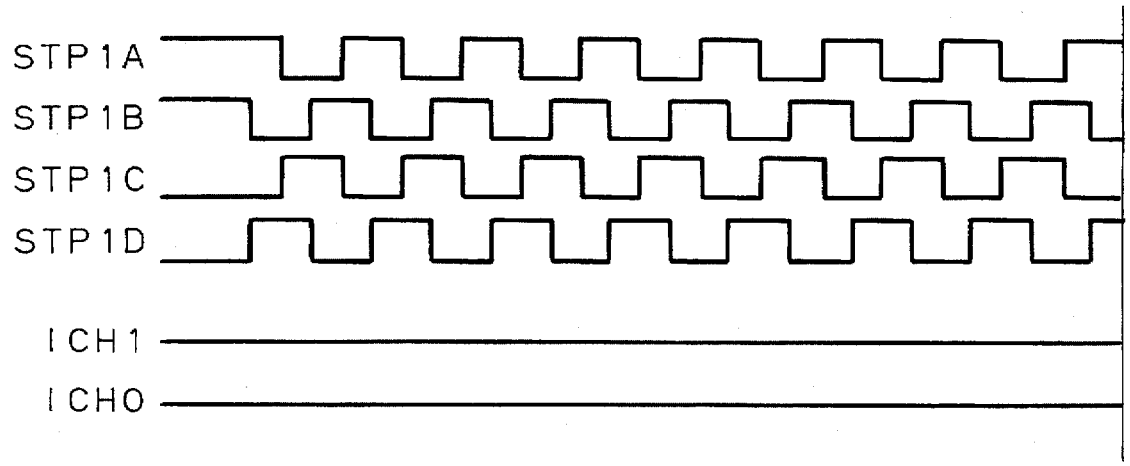
FIG. 16 is a timing chart showing phase drive signals and motor control signals to appear when the motor is reversed in the full-step mode.
Figure 17:
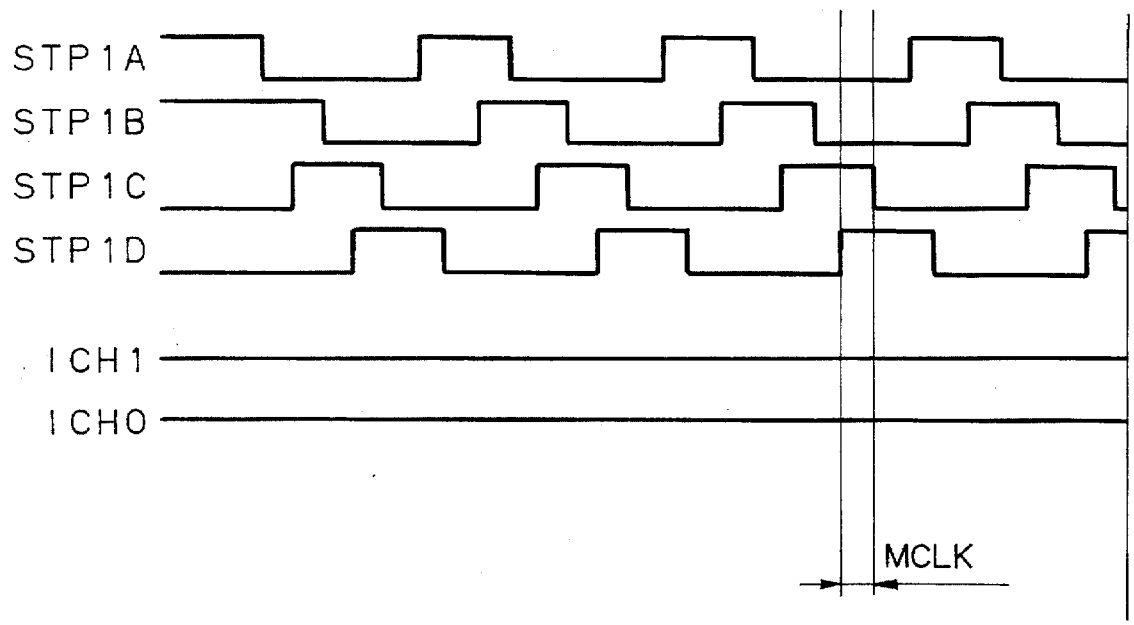
FIG. 17 is a timing chart showing phase drive signals and motor control signals to appear when the motor is driven forward in a half-step mode.
Figure 18:
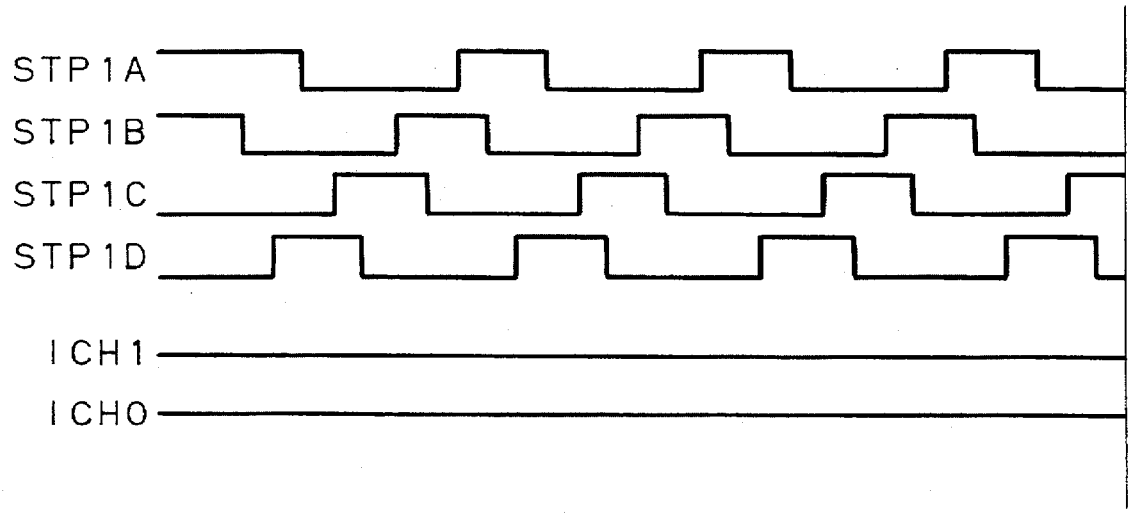
FIG. 18 is a timing chart showing phase drive signals and control signals to appear when the motor is reversed in the half-step mode.
Figure 19:
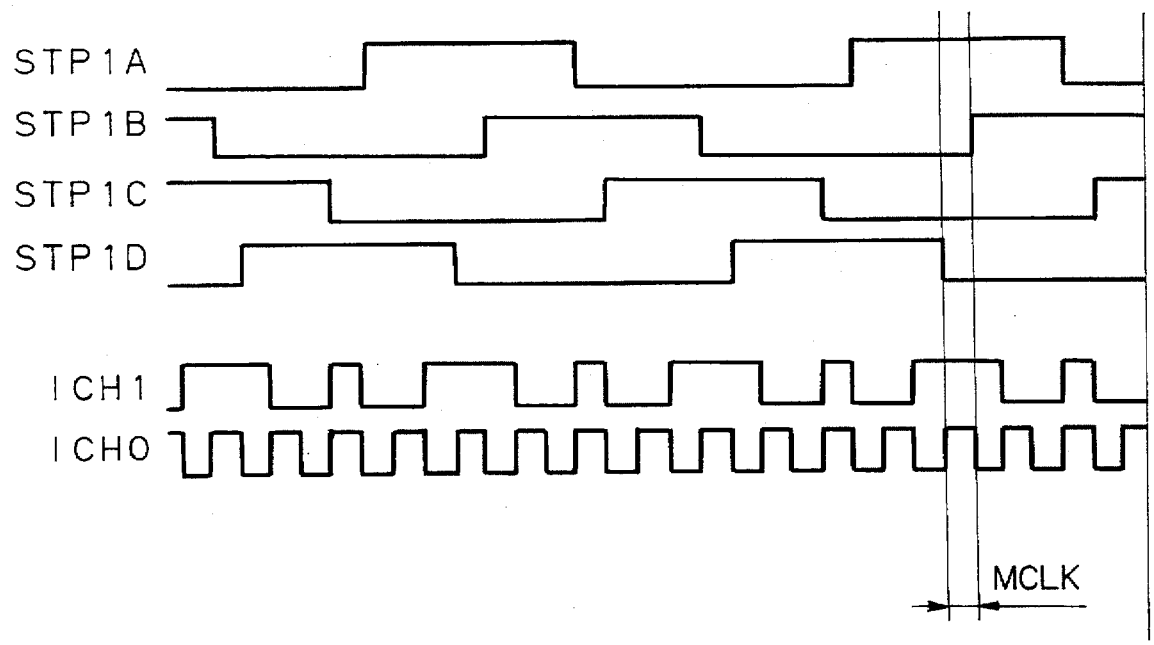
FIG. 19 is a timing chart showing phase drive signals and control signals to appear when the motor is driven forward in a quarter-step mode.
Figure 20:
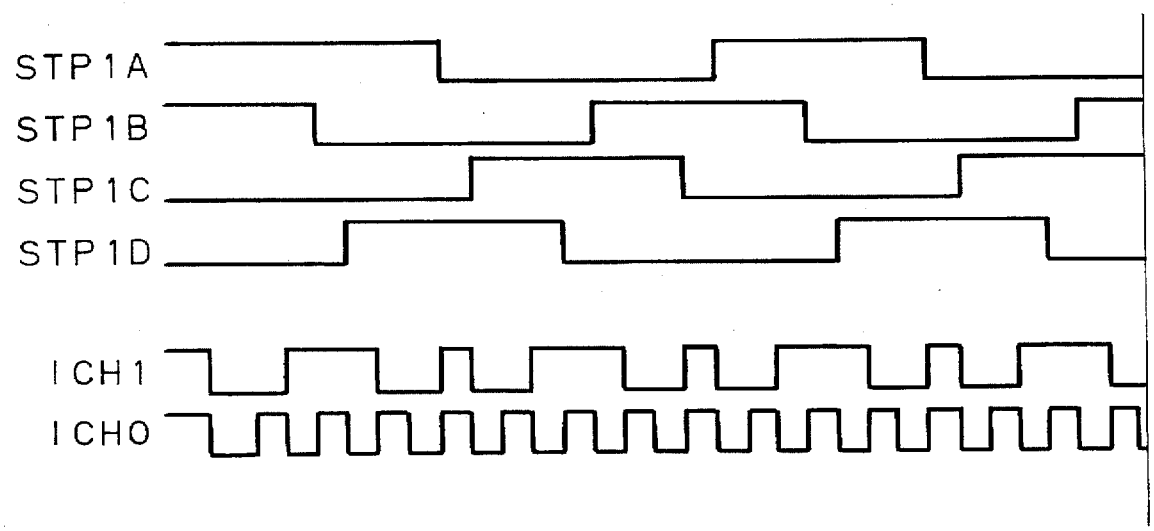
FIG. 20 is a timing chart showing phase drive signals and control signals to appear when the motor is reversed in the quarter-step mode.

The motor 51 is selectively driven by methods respectively corresponding to full-step drive, half-step drive (½ of the rotation speed assigned to full-step drive), and quarter-step drive (¼ of the rotation speed assigned to full-step drive). FIGS. 15–20 each shows the phase drive signals and motor control signals appearing in a particular combination of the driving method and rotating direction of the motor 51. Specifically, FIG. 15 shows the phase drive signals and motor control signals to appear when the motor 51 is rotated forward by the full-step drive. FIG. 16 shows the signals to appear when the motor 51 is reversed by the full-step drive. FIG. 17 shows the signals to appear when the motor 51 is driven forward by the half-step drive. FIG. 18 shows the signals to appear when the motor 51 is reversed by the half-step drive. FIG. 19 shows the signals to appear when the motor 51 is driven forward by the quarter-step drive. Further, FIG. 20 shows the signals to appear when the motor 51 is reversed by the quarter-step drive.

When the repetition counter 87 receives the repetition data load signal from the register 61, it sets the data representative of the number of times of repetition and also received from the register 61. When the constant-speed flag of the controller 62 is set to "1", the counter 87 is enabled and decrements in synchronism with the synchronizing pulses (MCLK) fed from the motor counter 85. When the counter 85 reaches "0", it stops decrementing and outputs the carry signal (Repetition CNTCO). The pulse counter 88 counts the synchronizing pulses (MCLK) output from the motor counter 85, and outputs data representative of the count to the comparator 89. After the coincidence signal (IRQ) has been fed from the comparator 89 to the CPU 41, the counter 88 is reset to "0" by a reset signal, not shown. The reset signal may be output from the CPU 41. Alternatively, a delay circuit may be used to delay the coincidence signal output from the comparator 89 so as to produce the reset signal. The comparator 89 compares the count represented by the read position count data output from the register 61 and the count represented by the output data of the pulse counter 88. When the two different data coincide with each other, the comparator 89 delivers the coincidence signal (IRQ) to the CPU 41.

A reference will be made to FIG. 8 for describing a specific operation of the control section 40 included in the copier. The routine to be described starts when the operator presses the copy start key. As shown, the CPU 41 sets data necessary for driving the motor 51 in the register 61 of the motor controller 45. The necessary data are the start address of the pulse rate data stored in the ROM 42 and used for both of acceleration and deceleration (acceleration/deceleration pulse rate data), the number of the data to be transferred, and the data representative of the number of times of repetition of the pulse rate data assigned to the constant-speed drive of the motor 51 (constant-speed pulse rate data included in the acceleration/deceleration pulse rate data or exclusive constant-speed pulse rate data) (repetition number data). If necessary, exclusive constant-speed pulse rate data, the start address of exclusive deceleration pulse rate data (different from the acceleration/deceleration pulse rate data), the number of the data to be transferred and so forth may be set on the operation panel. A plurality of different constant-speed pulse rate data are stored in the ROM 42 or the RAM 43; one of them may be read out in response to a signal from the operation panel and set in the register 61.

Subsequently, forward rotation (CW) is set in the register 61 of the motor controller 45 as a direction of rotation of the motor 51 (CW/CCW="1"). When the motor 51 is rotated forward, the carriage 5 of the scanner section 1 moves in the forward direction. After the previously mentioned read position count data has been set, the motor start signal (STP1NE) is output at a predetermined timing. In response, the motor controller 45 executes pulse rate generation procedure, which is hardware processing, and thereby rotates the motor 51 forward by a preselected number of pulses. On the completion of the pulse rate generation processing, the CPU 41 recognizes it in response to end interrupt signals which will be described later. Then, the CPU 41 again sets the data necessary for driving the motor 51 in the register 61 of the motor controller 45. On the elapse of a preselected holding time, the CPU 41 sets reverse rotation (CCW) as the direction of rotation of the motor 51 (CW/CCW="0"). The reverse rotation of the motor 51 causes the carriage 5 to move in the return direction. Subsequently, the CPU 41 outputs the motor start signal (STP1EN) at a predetermined timing. In response, the motor controller 45 again executes the pulse rate generation processing so as to reverse the motor 51 by a preselected number of pulses. When a predetermined period of time elapses after the end of the reverse rotation of the motor 51, the CPU 41 turns off the drive current for the motor 51.

Figure 8:
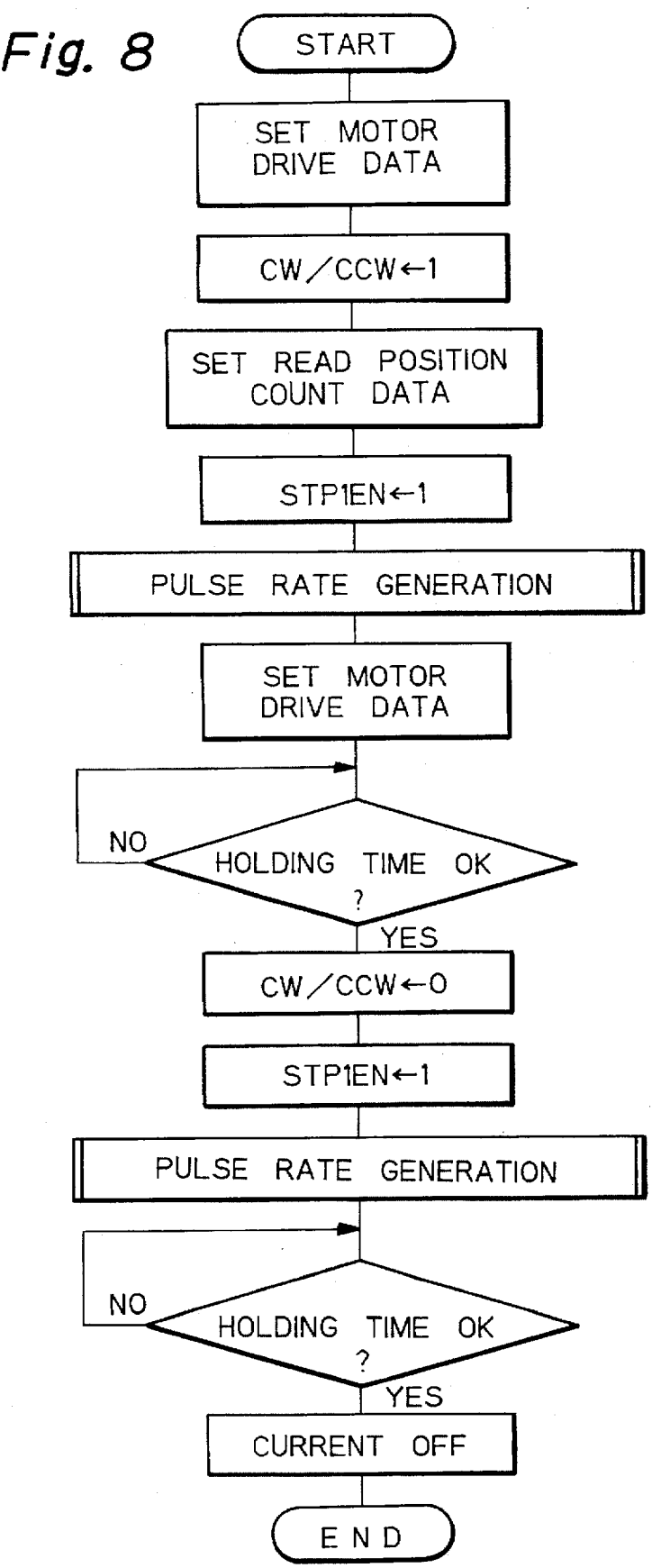
FIG. 8 is a flowchart demonstrating a specific operation of the control section shown in FIG. 3.
Figure 9:
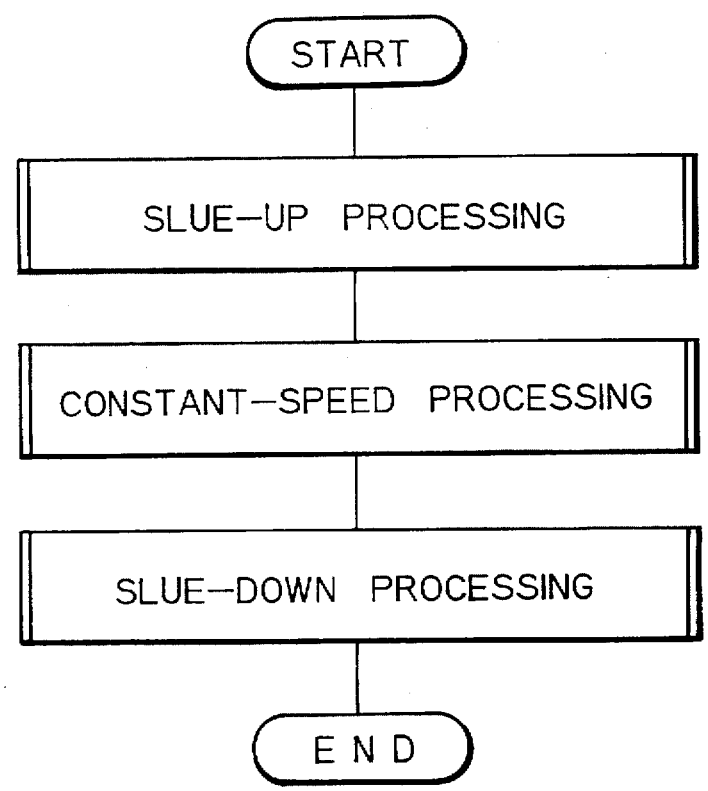
FIG. 9 is a flowchart representative of a pulse rate generating procedure shown in FIG. 8.

FIG. 9 shows the pulse rate generation procedure (hardware processing) of FIG. 8 in detail. Slue-up processing, constant-speed processing and slue-down processing shown in FIG. 9 are respectively executed by the hardware sequencers of the controller 62 shown in FIGS. 4 and 6. Among them, the slue-up processing and constant-speed processing slightly differ from the forward movement to the return movement of the carriage 5. In the illustrative embodiment, while the carriage 5 is in its forward movement, the synchronizing pulses output from the motor counter 85 are counted. When the count coincides with the count represented by the read position count data set in the register 61, the coincidence signal is output. Alternatively, such a procedure may be execute during the return movement of the carriage 5.

Figure 10A:
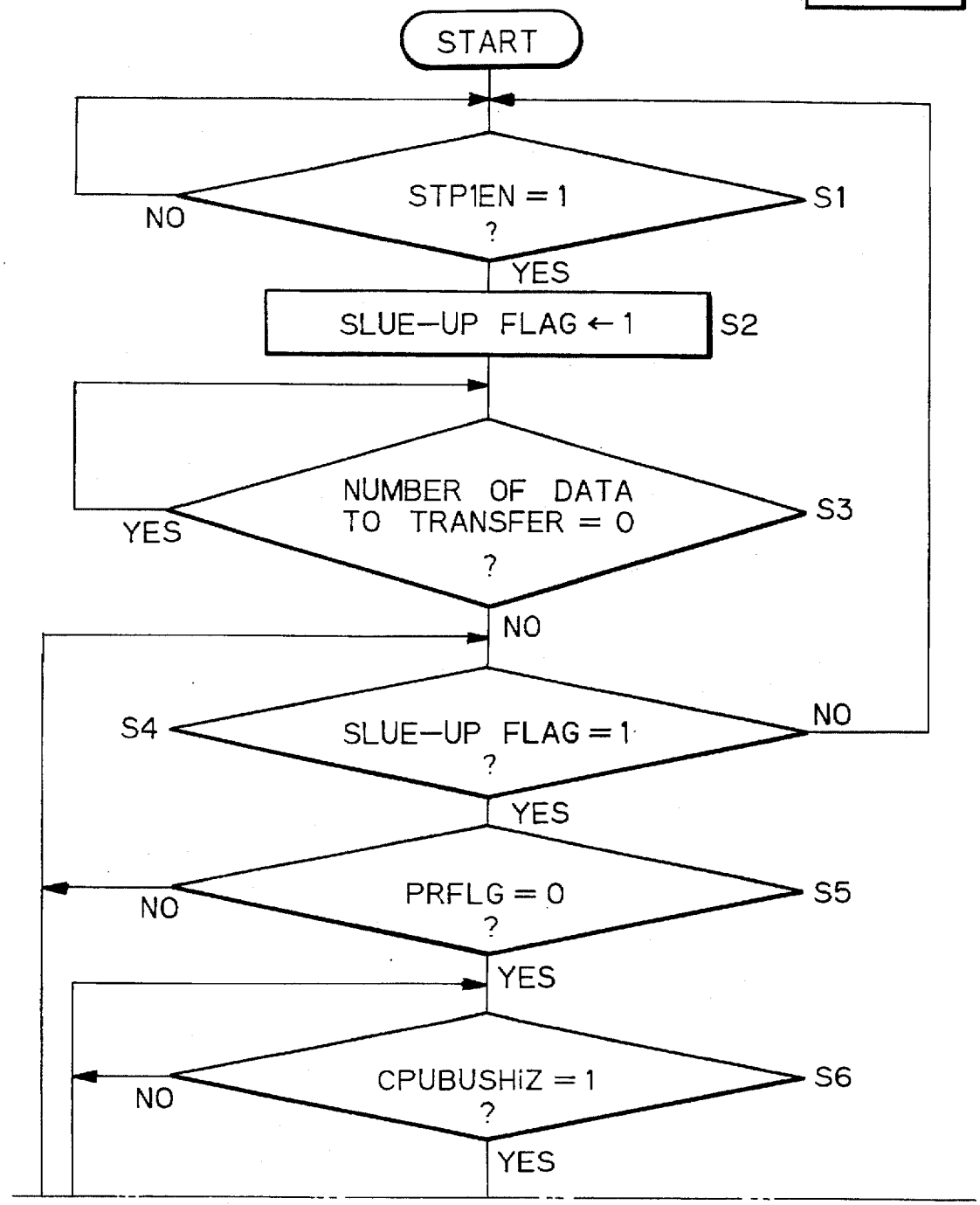
FIGS. 10 and 11 each shows a part of slue-up processing shown in FIG. 9.
Figure 10B:
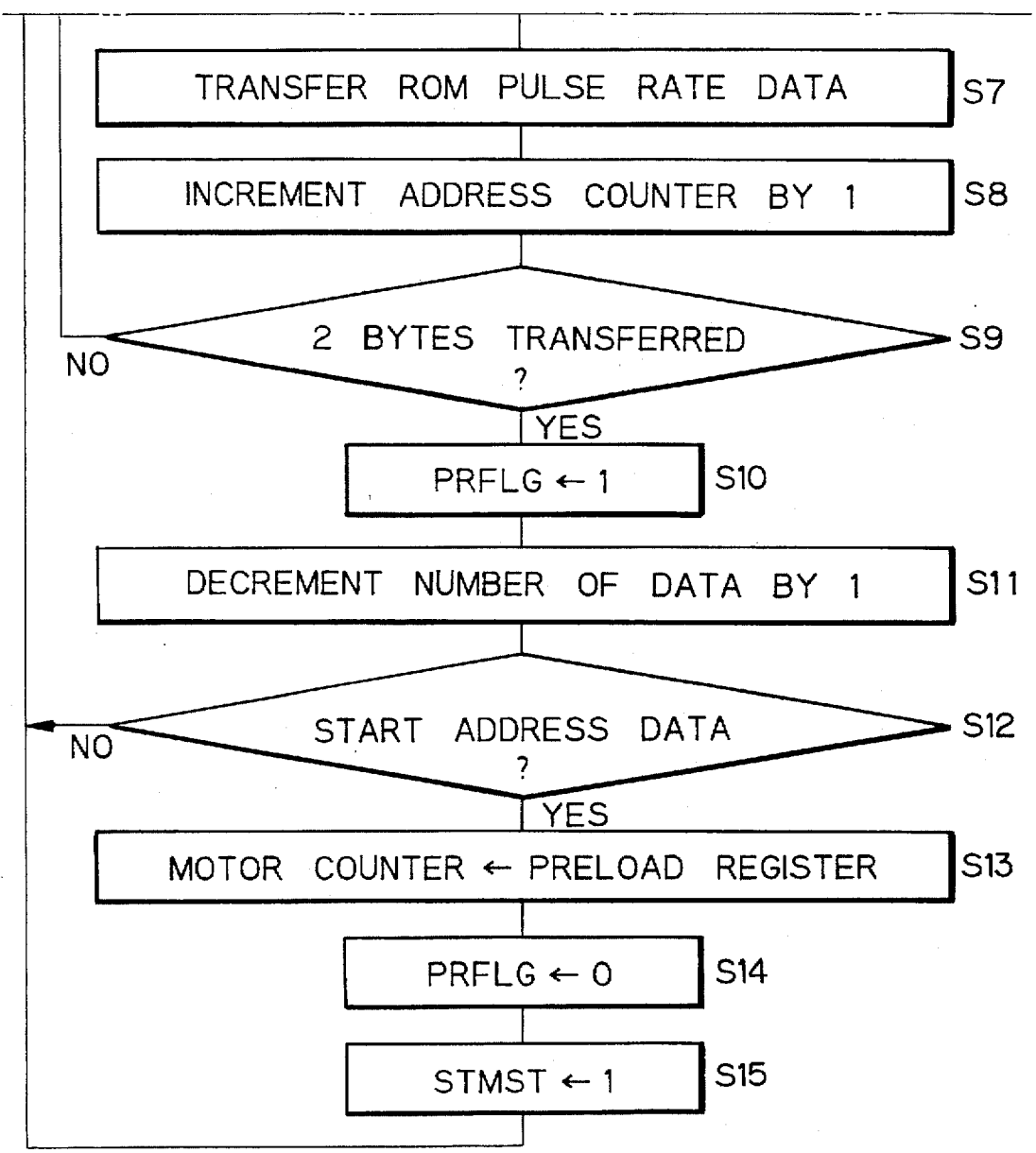
Figure 11:
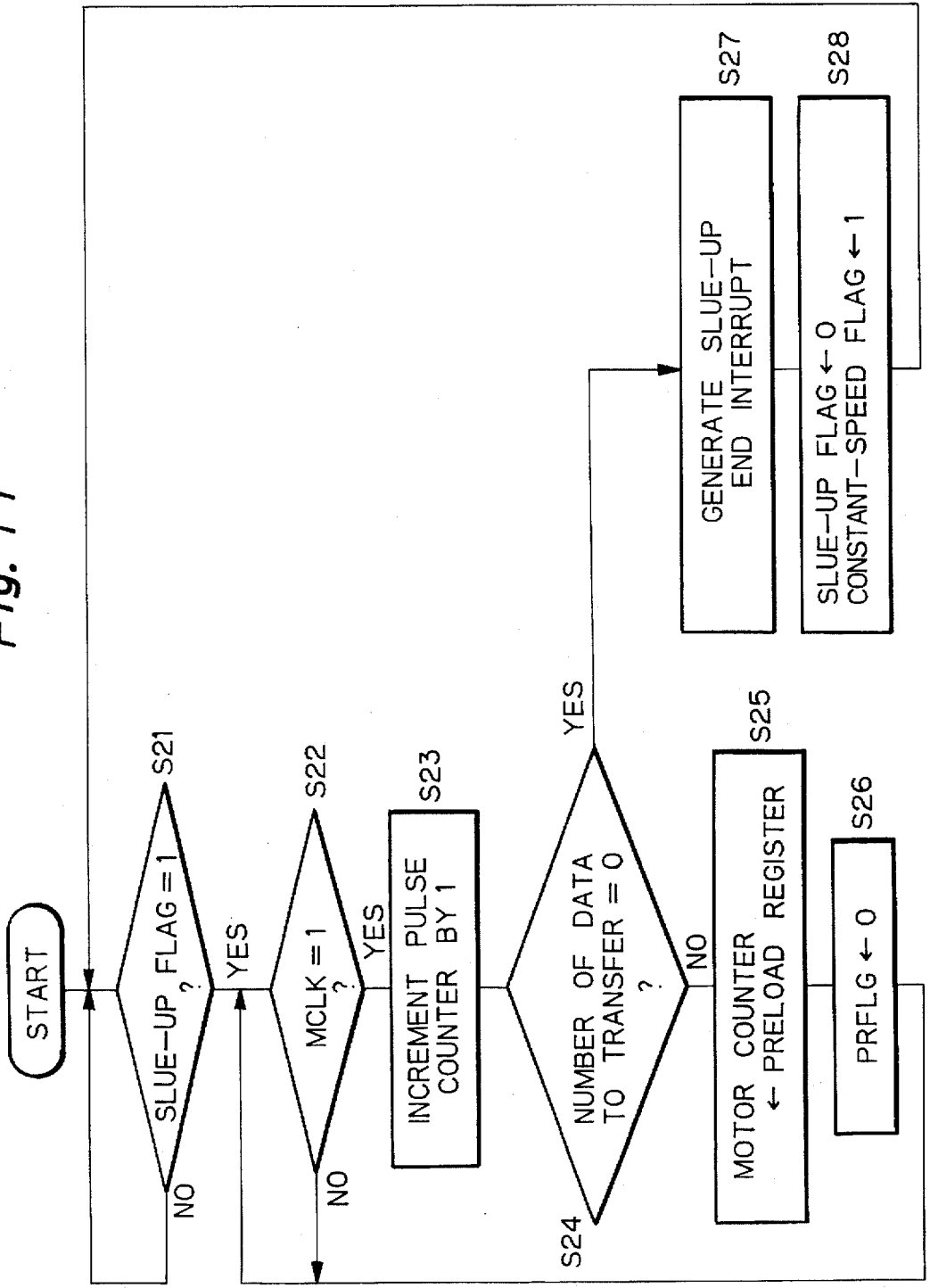

FIGS. 10 and 11 each shows the slue-up processing (corresponding to the forward movement of the carriage 5) specifically. The procedures shown in FIGS. 10 and 11 start up independently of each other.

In FIG. 10, the controller 62, FIG. 4, determines whether or not the motor start signal has been input (TEP1EN="1") (step S1). If the answer of the step S1 is positive (YES), the controller 62 sets the slue-up flag to "1" (step S2). Then, the controller 62 determines whether or not the number of acceleration/deceleration pulse rate data to be transferred is "0" (step S3). If the answer of the step S3 is negative (NO), the controller 62 determines whether or not the slue-up flag is "1" (step S4). If the answer of the step S4 is YES, the controller 62 determines whether or not the pulse generator 63 is requesting the transfer (loading) of the pulse rate data (ROMDATA) (PRFLG="0") (step S5). If the answer of the step S5 is YES, the controller 62 determines whether or not the CPU 41 is not using the bus (CPUBUSHiZ="1") (step S6). If the answer of the step S6 is YES, the controller 62 causes, among the acceleration/deceleration pulse rate data stored in the ROM 42, FIG. 3, the data of the address designated by a ROM address counter, not shown, (initially the start address) to be transferred to the pulse generator 63 (step S7). Thereafter, the controller 62 increments the ROM address counter (up mode at this time) by 1 (one) (step S8).

Although not shown in FIG. 10, the ROM address counter sets, in response to the start address signal (Start ADDR) fed from the register 61, the start address of the acceleration/ deceleration pulse rate data (or deceleration pulse rate data) stored in the ROM 42. When the counter is enabled, it increments if the up mode is set up or decrements if the down mode is set up, thereby designating an address.

The controller 62 determines whether or not two bytes of acceleration/deceleration pulse rate data (two bytes are used as a unit) have been transferred (step S9). If the answer of the step S9 is NO, the program returns to the step S6. If the answer of the step S9 is YES, the controller 62 sets the preload flag circuit 81, FIG. 7, (PRFLG="1") (step S10), thereby canceling the pulse rate data transfer request. Subsequently, the controller 62 decrements the number of acceleration/deceleration pulse rate data to be transferred by 1 (step S11). Then, the controller 62 determines whether or not the pulse rate data transferred this time is the first data (start address) (step S12). If the answer of the step S12 is NO, the controller 62 returns to the step S4. If the answer of the step S12 is YES, the controller 62 sets the acceleration/ deceleration pulse rate data (number of pulse rates) fed from the preload register 84 in the motor counter 85 (step S13). Then, the controller 62 resets the preload flag circuit 81 (PRFLG="0") so as to request the transfer of the pulse rate data (step S14). Thereafter, the controller 62 sets the count enable signal (STMST) to "1" to enable the motor counter 85 (step S15), and then returns to the step S4.

When the motor counter 85 is enabled, as stated above, it decrements in synchronism with the reference clock. On reaching "0", the counter 85 once stops decrementing and generates a synchronizing pulse (MCLK="1"), again sets the pulse rate data fed from the preload register 84, and then repeats the above procedure.

The phase drive pattern generator 86, FIG. 7, selects a particular driving method and a particular direction of rotation of the motor 51 on the basis of the signals EX1, EX2 and CW/CCW received from the register 61. Further, the pattern generator 86 sends the phase drive signals and, if necessary, motor control signals to the motor driver 46, thereby driving the motor 51.

On the other hand, in FIG. 11, the controller 62 determines whether or not the slue-up flag is "1" (step S21). Only if the answer of the step S21 is YES, the controller 62 determines whether or not the motor counter 85 has generated a synchronizing pulse (MCLK) (MCLK="1") (step S22). This can be done with reference to the preload flag. If the answer of the step S22 is YES, the controller 62 increments the pulse counter 88 by 1 (step S23), and then determines whether or not the number of acceleration/ deceleration pulse rate data to be transferred is "0" (step S24). If the answer of the step S24 is NO, the controller 62 sets the acceleration/deceleration pulse rate data (number of pulse rates) received from the preload register 84 in the motor counter 85 (step S25). After resetting the preload flag (PRFLG) (step S26), the controller 62 returns to the step S27 so as to repeat the above procedure. When the answer of the step S24 turns from NO to YES, the controller 62 generates a slue-up end interrupt signal (step S27), resets the slue-up flag to "0" (step S28), and sets the constant-speed flag to "1".

FIG. 19 shows the constant-speed processing (corresponding to the forward movement of the carriage 5) shown in FIG. 9. As shown, the controller 62 determines whether or not the constant-speed flag is "1" (step S31). If the answer of the step S31 is YES, the controller 62 determines whether or not to change the constant-speed pulse rate data, i.e., whether or not to replace the constant-speed pulse rate data included in the acceleration/deceleration pulse rate data with constant-speed pulse rate data fed from the CPU 41 (step S32). This can be done by determining whether or not the constant-speed data change signal is present. If the answer of the step S32 is YES, meaning that constant-speed pulse rate data has been set in the register 61 by the CPU 41, the controller 62 sets it in the preload register 84. Then, the controller 62 checks the repetition counter 87 to see if its count is "0 (step S34)".

If the answer of the step S34 is NO, the controller 62 determines whether or not the motor 85 has generated a synchronizing pulse (MCLK="1") (step S35). If the answer of the step S35 is YES, the controller 62 sets the constant-speed pulse rate data received from the preload register 84 in the motor counter 85 (step S36), and the increments the pulse counter 88 by 1 (step S37). Subsequently, the controller 62 compares a count represented by the output data of the pulse counter 88 and a count represented by the read position count data output from the register 61. If the two counts are coincident (YES, step S38), the controller 62 outputs the coincidence signal (IRQ=1) (step S39), and then decrements the repetition counter by 1 (step S40). If the answer of the step S38 is NO, the controller 62 directly executes the step S40.

Figure 12B:
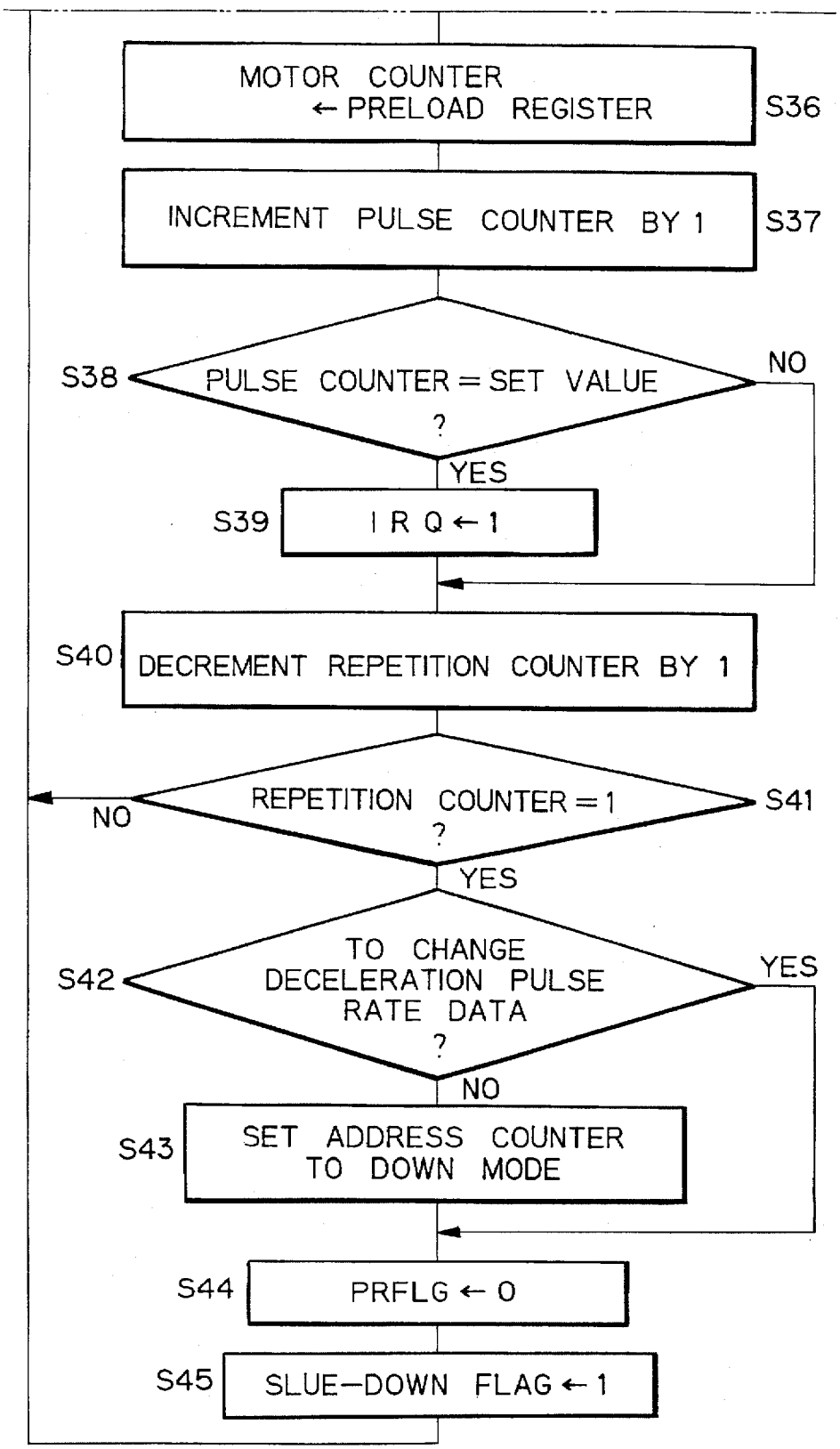
FIG. 12 is a flowchart representative of constant-speed processing shown in FIG. 9.
Figure 12C:
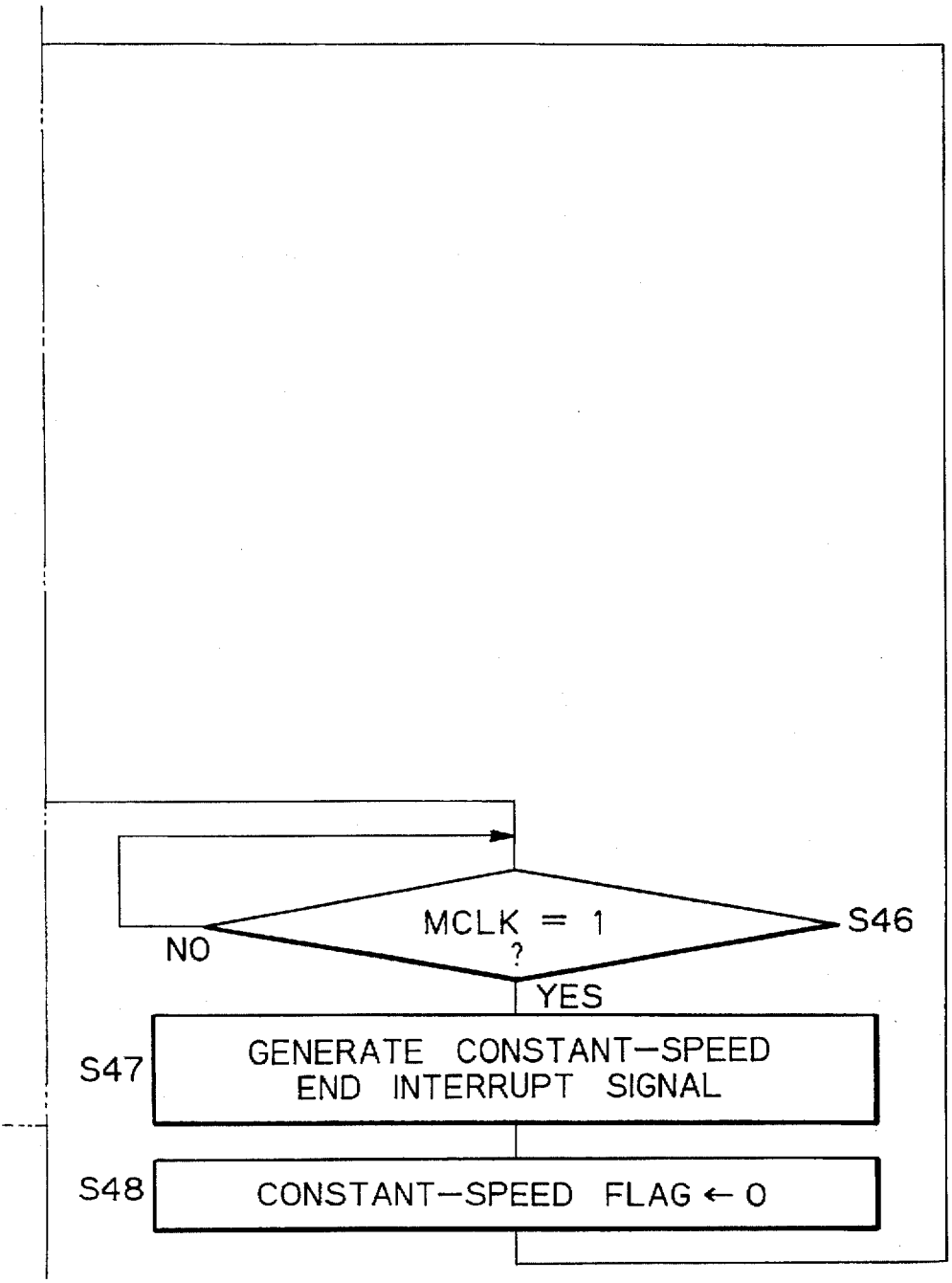

Although not shown in FIG. 12, when the repetition counter 87 receives the repetition data load signal from the register 61, it sets the repetition number data output from the register 61. After the constant-speed flag in the controller 62 has been set to "1" and has enabled the counter 87, the counter 87 sequentially decrements in response to the synchronizing pulses from the motor counter 85.

The controller 62 determines whether or not the repetition counter 87 is "1" (step S41). If the answer of the step S41 is NO, the controller 62 returns to the step S31. If the answer of the step S41 is YES, the controller 62 determines whether or not to change the deceleration pulse rate data, i.e., whether or not to replace the acceleration/deceleration pulse rate data with the exclusive deceleration pulse rate data (step S42). This can be done on the basis of the presence/absence of the deceleration data change signal. If the answer of the step S42 is YES, the controller 62 executes a step S44; if otherwise, it conditions the address counter for the down mode (step S43), and then executes the step S44. In the step S44, the controller 62 resets the preload flag (PRFLG) to "0". Then, the controller 62 sets the slue-down flag to "1" (step S45) and returns to the step S31. If the count of the repetition counter 87 is "0" (YES, step S34), the controller 62 determines whether or not the motor counter 85 has generated a synchronizing pulse (MCLK) (MCLIK="1") (step S46). If the answer of the step S46 is YES, the controller 62 generates the constant-speed end interrupt signal (step S47) and resets the constant-speed flag to "0" (step S48).

Figure 13A:
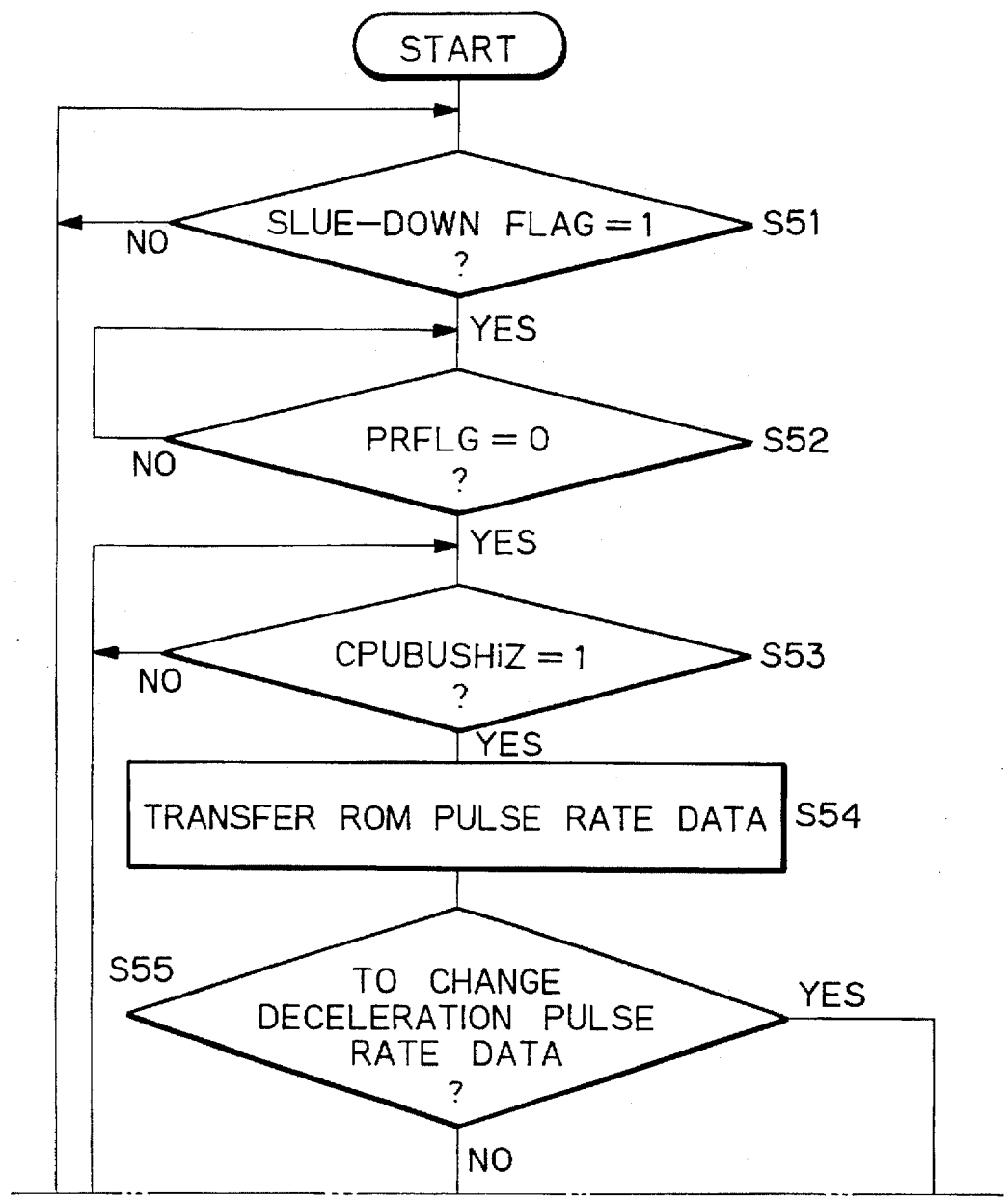
FIGS. 13 and 14 each shows a part of slue-down processing shown in FIG. 9.
Figure 13B:
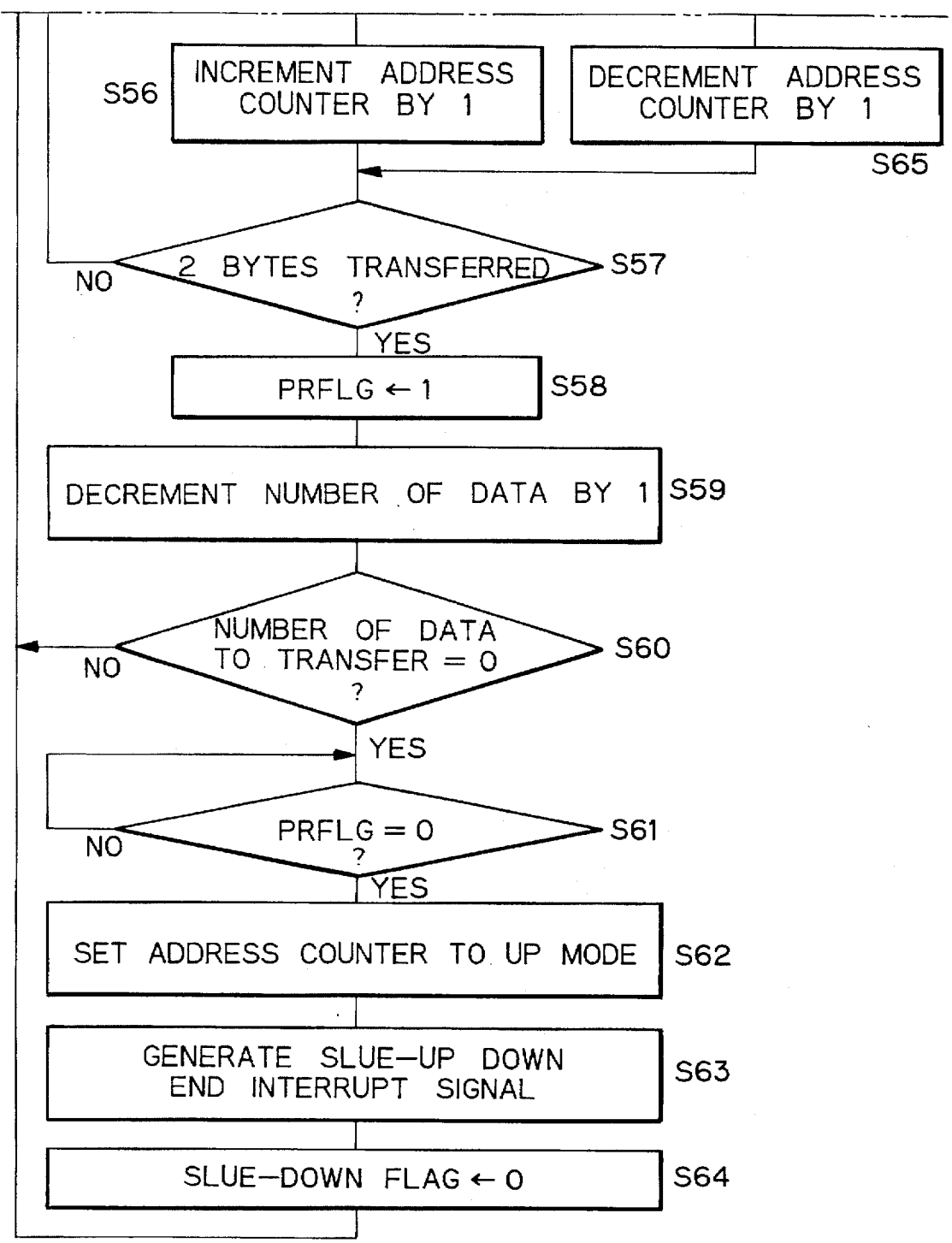
Figure 14:
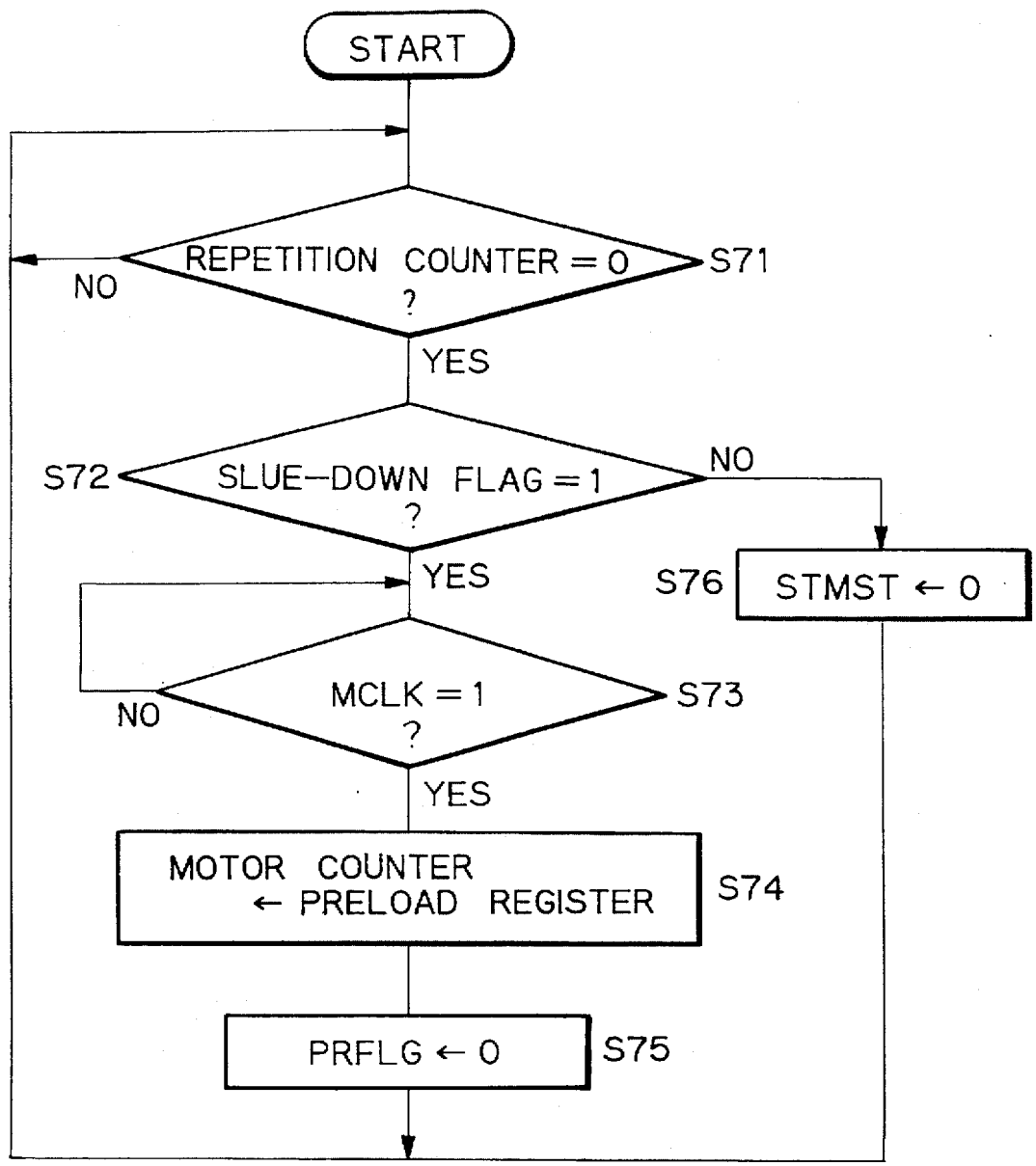

FIGS. 13 and 14 demonstrate the slue-down processing of FIG. 9 specifically. The procedures shown in FIGS. 13 and 14 start up independently of each other.

In FIG. 13, the controller 62 determines whether or not the slue-down flag is "1" (step S51) and determines, if it is "1", whether or not the preload flag (PRFLG) is "0" (step S52). If the answer of the step S52 is YES, the controller 62 determines whether or not the CPU 41 is not using the bus (CPUBUSHiZ="1") (step S53) If the CPU 41 is not using the bus, the controller 62 transfers, among the acceleration/deceleration pulse rate data (or deceleration pulse rate data) stored in the ROM 42, the pulse rate data of the address designated by the ROM address counter (initially the start address) to the pulse generator 63 (step S54). Subsequently, the controller 62 determines whether or not to change the deceleration pulse rate data, i.e., whether or not to replace the acceleration/deceleration pulse rate data with the exclusive deceleration pulse rate data on the basis of the presence/absence of the deceleration data change signal (step S55). If the answer of the step S55 is YES, the controller 62 increments the ROM address counter by 1 (step S65); if otherwise, it decrements the ROM address counter by 1 (step S56).

Thereafter, the controller 62 determines whether or not two bytes of acceleration/deceleration pulse rate data (deceleration pulse rate data) have been transferred (step S57). If the answer of the step S57 is NO, the controller 62 returns to the step S53. If the answer of the step S57 is YES, the controller sets the preload flag (PRFLG) to "1" (step S58) and then decrements the number of acceleration/deceleration pulse rate data (deceleration pulse rate data) to be transferred (step S59). The controller 62 determines whether or not the number of acceleration/deceleration pulse rate data (or deceleration pulse rate data) to be transferred is "0" (step S60). If the answer of the step S60 is NO, the controller 62 returns to the step S51; if otherwise, it determines whether or not the preload flag (PRFLG) is "0" (step S61). If the answer of the step S61 is YES, the controller 62 restores the ROM address counter to the up mode, generates the slue-down end interrupt signal (step S63), and then resets the slue-down flag to "0" (step S64).

In FIG. 14, the controller 62 determines whether or not the count of the repetition counter 87 is "0" (step S71) and determines, if it is "0", whether or not the slue-down flag is "1" (step S72). If the answer of the step S72 is YES, the controller 62 determines whether or not the motor counter 85 has generated a synchronizing pulse (MCLK) (MCLK="1") (step S73). If the answer of the step S73 is YES, the controller 62 sets the acceleration/deceleration pulse rate data (or the exclusive deceleration pulse rate data) received from the preload register 84 in the motor counter 85 (step S74), resets the preload flag (PRFLG) to "0" (step S75), and then returns to the step S71. When the slue-down flag is "0", the controller resets the count enable signal (STMST) to thereby disenable the motor counter 85 (step S78).

The CPU 41 shown in FIG. 3 executes either polling processing or interrupt processing. During polling processing, the CPU 41 periodically determines whether or not the coincidence signal is input from the motor controller 45. When the coincidence signal is input, the CPU 41 determines that the number of steps of the motor 51 has reached the preselected number (arrival of the carriage 5 at the reading position), and causes the carriage 5 to start reading the document. During interrupt processing, the CPU 41 forcibly interrupts processing under way on receiving the coincidence signal. Then, the CPU 41 causes the carriage 5 to start reading the document, determining that the motor 51 has reached the preselected number of steps.

As stated above, in the illustrative embodiment, the motor controller shown in FIG. 3 loads the control data for acceleration, constant-speed drive and deceleration stored in the ROM 42 or the RAM 43, and controls the motor 51 via the motor driver 46 therewith. This successfully reduces the load on the CPU 41 due to the acceleration, constant-speed drive and deceleration of the motor 51, thereby implementing high-speed and accurate drive of the motor 51.

The motor counter 85 shown in FIG. 7 and included in the pulse generator 63 of the motor controller 45 generates synchronizing pulses or drive pulses (MCLK) on the basis of the above control data. The phase drive pattern generator 86 generates, in synchronism with the synchronizing pulses, phase drive signals for driving the phase coils of the motor 51. Hence, the motor 51 can be controlled with ease.

The pulse counter 88 counts the synchronizing pulses and generates a coincidence signal when the count coincides with a value set by the CPU 41 (preselected number of steps of the motor 51). Only if the coincidence signal is input to the CPU 41, the CPU 41 can cause the carriage to start reading the document, determining that the motor 51 has reached the preselected number of steps. This reduces the load on the CPU 41 to a significant degree and thereby promotes the use of a low performance CPU. As a result, the production cost of a digital copier is reduced. Because the CPU 41 makes the above decision on the basis of the number of steps (drive pulses) of the motor 51, the time when the motor 51 reaches the preselected number of steps remains constant.

Because the control data are step-by-step pulse rate data meant for the motor 51, acceleration and deceleration curves can be flexibly set. Because the control data assigned to the constant-speed drive of the motor 51 can be set even by the CPU 41, it is possible to finely adjust the rotation speed of the motor 51 during the course of constant-speed drive. As a result, irregularities in mechanical arrangement and wear due to aging can be compensated for.

The CPU 41 sets the advance angle for a single drive pulse (driving method), the direction of rotation and the number of times of repetition of the drive pulse (pulse rate data) during constant-speed drive of the motor 51. Hence, the motor 51 can be driven with flexibility.

Furthermore, the acceleration and deceleration of the motor 51 can be implemented either by the same control data or by different control data. Hence, it is possible to set up a relation $f_0 < f_0$ where $f_0$ and $f_0$ are respectively the start frequency and end frequency at the time of acceleration of the motor 51 and associated with the control data, and a relation $\alpha < \beta$ where $\alpha$ and $\beta$ are respectively the acceleration rate and deceleration rate. It follows that if control data different from control data for acceleration are selected for deceleration such that the end frequency and deceleration rate increase, the deceleration time can be made shorter than the acceleration time. This reduces the reading time of the scanner section 1 and thereby increases the processing ability for a unit time.

If desired, the motor controller 45 may constitute a part of a control LSI (Large Scale Integrated circuit) included in the copier in order to be reduced in size and cost.

Various modifications will become possible for those skilled in the art after receiving the teachings of the present disclosure without departing from the scope thereof. For example, while the embodiment has concentrated on a digital copier whose scanner section includes a stepping motor, the present invention is practicable with any other kind of electronic apparatus, e.g., a printer or similar image forming apparatus so long as it uses a stepping motor.

What is claimed is:

1. A device for controlling drive of a stepping motor for driving a movable section of an electronic apparatus, said device comprising:

motor drive means for driving the stepping motor;

a microprocessor for controlling said motor drive means;

store means for storing control data to be used during acceleration, constant-speed drive and deceleration of the stepping motor; and motor control means for loading said control data stored in said store means to said motor drive means without the intermediary of said microprocessor, and controlling the stepping motor via said motor drive means with said control data.

2. A device as claimed in claim 1, wherein said motor control means comprises pulse generating means for generating drive pulses in accordance with said control data, and phase drive signal generating means for generating, in synchronism with said drive pulses, phase drive signals for driving phase coils included in the stepping motor.

3. A device as claimed in claim 2, wherein said motor control means comprises coincidence signal generating means for counting said drive pulses, and generating a coincidence signal when a count of said drive pulses coincides with a preselected value set by said microprocessor.

4. A device as claimed in claim 1, wherein said control data comprise step-by-step pulse rate data meant for the stepping motor.

5. A device as claimed in claim 1, wherein a part of said control data to be used during the constant-speed drive of the stepping motor are set by said microprocessor.

6. A device as claimed in claim 1, wherein an advance angle, a direction of rotation and a number of times of repetition of the drive pulse during the constant-speed drive of the stepping motor are set by said microprocessor.

7. A device as claimed in claim 1, further comprising means for selecting either same control data or different control data for the acceleration and deceleration of the stepping motor.

8. A device as claimed in claim 1, wherein said motor control means constitutes a part of an LSI (Large Scale Integrated circuit) included in the electronic apparatus.

9. An electronic apparatus having a movable section, comprising:

a stepping motor for driving said movable section; and a control device for controlling drive of said stepping motor;

said control device comprising:

motor drive means for driving the stepping motor;

a microprocessor for controlling said motor drive means;

store means for storing control data to be used during acceleration, constant-speed drive and deceleration of the stepping motor; and motor control means for loading said control data stored in said store means without the intermediary of said microprocessor, and controlling the stepping motor via said motor drive means with said control data.

\* \* \* \* \*